(12) United States Patent
Cordero et al.

(10) Patent No.: US 10,711,183 B2
(45) Date of Patent: Jul. 14, 2020

(54) SYNTHESIS OF NANOCRYSTALS

(71) Applicant: Massachusetts Institute of Technology, Cambridge, MA (US)

(72) Inventors: Jose M. Cordero, Penuelas, PR (US); Yue Chen, Cambridge, MA (US); Moungi G. Bawendi, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 607 days.

(21) Appl. No.: 15/256,521

(22) Filed: Sep. 3, 2016

(65) Prior Publication Data

US 2017/0198217 A1    Jul. 13, 2017

Related U.S. Application Data

(60) Provisional application No. 62/214,743, filed on Sep. 4, 2015.

(51) Int. Cl.
| | | |
|---|---|---|
| *C09K 11/02* | (2006.01) | |
| *C09K 11/66* | (2006.01) | |
| *C09K 11/88* | (2006.01) | |
| *B82Y 40/00* | (2011.01) | |
| *B82Y 30/00* | (2011.01) | |
| *B82Y 20/00* | (2011.01) | |

(52) U.S. Cl.
CPC ............ *C09K 11/025* (2013.01); *B82Y 40/00* (2013.01); *C09K 11/02* (2013.01); *C09K 11/663* (2013.01); *C09K 11/883* (2013.01); *B82Y 20/00* (2013.01); *B82Y 30/00* (2013.01); *Y10S 977/774* (2013.01); *Y10S 977/824* (2013.01); *Y10S 977/892* (2013.01); *Y10S 977/896* (2013.01); *Y10S 977/95* (2013.01)

(58) Field of Classification Search
CPC ..... C09K 11/02; C09K 11/025; C09K 11/661; C09K 11/662; C09K 11/663; C09K 11/883; B82Y 40/00; H01L 51/426
See application file for complete search history.

(56) References Cited

U.S. PATENT DOCUMENTS

| | | |
|---|---|---|
| 7,115,688 B1 | 10/2006 | Mirkin et al. |
| 2008/0207934 A1* | 8/2008 | Kim ........................ B82Y 30/00 554/74 |
| 2012/0049119 A1 | 3/2012 | Greytak et al. |
| 2013/0240787 A1 | 9/2013 | Chen et al. |

OTHER PUBLICATIONS

Rosenzweig et al., "Synthesis of Glyconanospheres Containing Luminescent CdSe-ZnS Quantum Dots", Nanoletters, vol. 3, No. 5, pp. 581-584. (Year: 2003).*
Notification Concerning Transmittal of International Preliminary Report on Patentability (PCT/IB/326) issued in PCT/US2016/050301 dated Mar. 15, 2018.

(Continued)

*Primary Examiner* — Matthew E. Hoban
*Assistant Examiner* — Lynne Edmondson
(74) *Attorney, Agent, or Firm* — Steptoe & Johnson LLP

(57) ABSTRACT

A nanocrystal composition can include a nanocrystal and an outer layer including a ligand bound to the nanocrystal, wherein the ligand includes a norbornene group and a carboxyl group.

11 Claims, 28 Drawing Sheets

(56) References Cited

OTHER PUBLICATIONS

International Search Report dated Dec. 8, 2016, issued in International Application No. PCT/US2016/050301.
Written Opinion of the International Searching Authority dated Dec. 8, 2016, issued in International Application No. PCT/US2016/050301.
Notification of Transmittal of the International Search Report and the Written Opinion of the International Searching Authority, or the Declaration dated Dec. 8, 2016, issued in International Application No. PCT/US2016/050301.
Skaff et al. "Crosslinked Capsules of Quantum Dots by Interfacial Assembly and Ligand Crosslinking" Advanced Materials, vol. 17 Issue 17 (Aug. 29, 2005): pp. 2082-2086; entire document, but especially: p. 2083 col. 1 para 1, figure 1, figure 1 footnote.
Nedelcu et al. "Fast Anion-Exchange in Highly Luminescent Nanocrystals of Cesium Lead Halide Perovskites ($CsPbX_3$, X=Cl, Br, I)" Nano Letters, vol. 15 Issue 6 (Jan. 29, 2015): pp. 3692-3696; abstract, p. 5635 col. 2 para 2.
Reiss et al. "Core/Shell Semiconductor Nanocrystals" Small, vol. 5 Issue 2 (Jan. 19, 2009): pp. 154-168; p. 157 col. 1 para 2, p. 187 col. 2 para 2, p. 159 col. 1 para 3, figure 2, table 1.
Kudera et al. "Sequential Growth of Magic-Size CdSe Nanocrystals" Advanced Materials, vol. 19 Issue 4 (Jan. 24, 2007): pp. 548-552; entire document, but especially: p. 551 col. 2 para 3.
Koenig et al. "Shell Cross-Linked Au Nanoparticles" Langmuir, vol. 22 Issue 11 (Apr. 29, 2006): pp. 5168-5173; p. 5168 col. 2 para 4, scheme 1.

\* cited by examiner

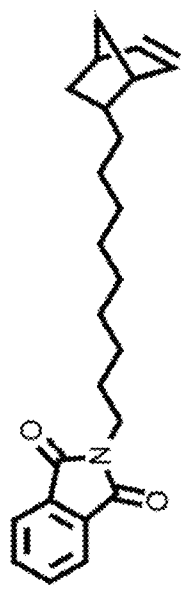
FIG. 9

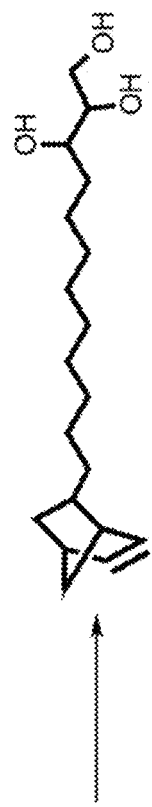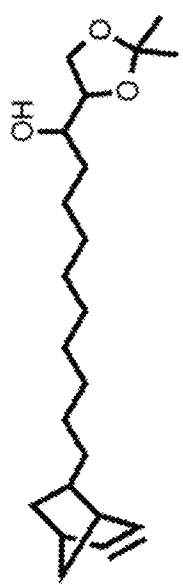
FIG. 11

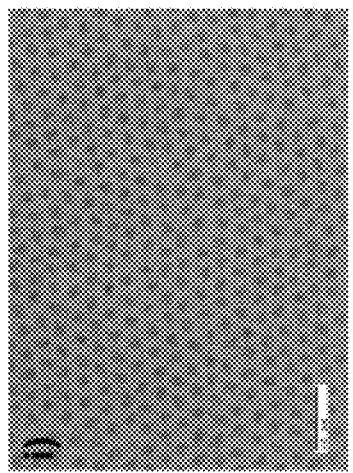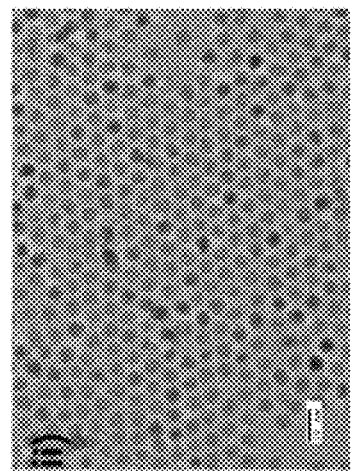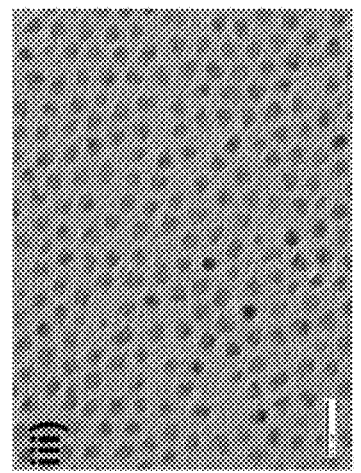
FIG. 13C

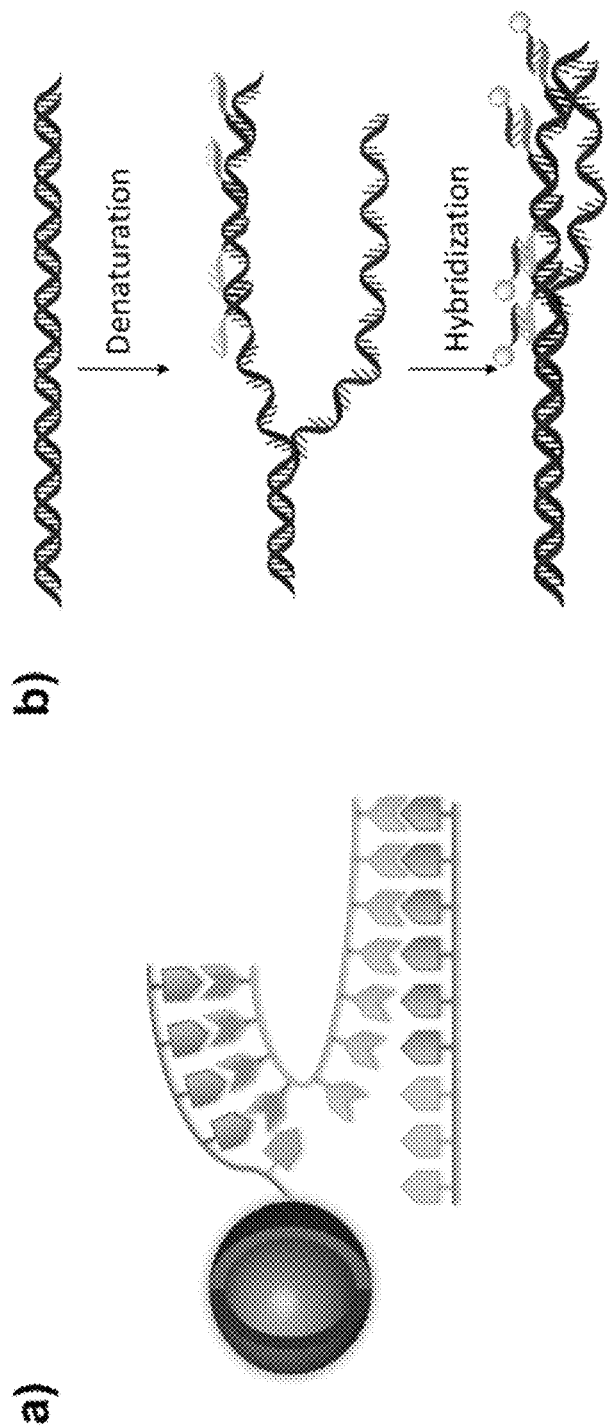

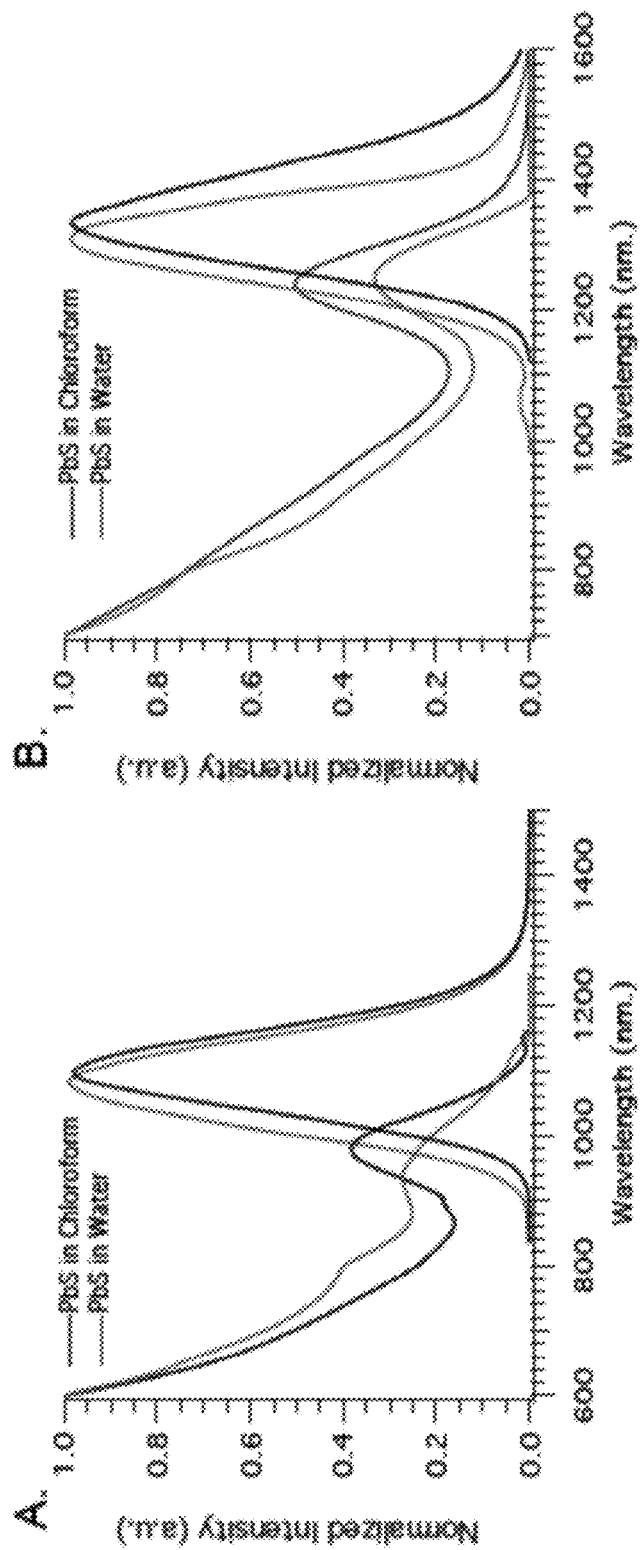

SYNTHESIS OF NANOCRYSTALS

CLAIM OF PRIORITY

This application claims priority to U.S. Provisional Patent Application No. 62/214,743, filed Sep. 4, 2015, which is incorporated by reference in its entirety.

FEDERAL SPONSORSHIP

This invention was made with Government support under Grant Nos. R01 CA126642 and U54 CA151884 awarded by the National Institutes of Health and under Contract No. W911NF-13-D-0001 awarded by the Army Research Office. The Government has certain rights in the invention.

FIELD OF THE INVENTION

The invention relates to nanocrystal composition includes a nanocrystal and an outer layer including a ligand bound to the nanocrystal, wherein the ligand includes a norbornene group and a carboxyl group.

BACKGROUND

Semiconductor nanocrystals have been a subject of great interest, promising extensive applications including display devices, information storage, biological tagging materials, photovoltaics, sensors and catalysts. Nanocrystals having small diameters can have properties intermediate between molecular and bulk forms of matter. For most applications, nanocrystals must be processed outside of their growth solution and transferred into various chemical environments.

SUMMARY

In one aspect, a nanocrystal composition can includes a nanocrystal, and an outer layer including a ligand bound to the nanocrystal, wherein the ligand includes a norbornene group and a carboxyl group. The nanocrystal can be a semiconductor nanocrystal includes a core of a first semiconductor material.

In certain embodiments, the first semiconductor material can be a Group II-VI compound, a Group II-V compound, a Group III-VI compound, a Group III-V compound, a Group IV-VI compound, a Group compound, a Group II-IV-VI compound, or a Group II-IV-V compound. For example, the first semiconductor material is ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof. The semiconductor nanocrystal can include a second semiconductor material overcoated on the first semiconductor material. The first semiconductor material can have a first band gap, and the second semiconductor material can have a second band gap that is larger than the first band gap. The second semiconductor material can be a Group II-VI compound, a Group II-V compound, a Group III-VI compound, a Group III-V compound, a Group IV-VI compound, a Group compound, a Group II-IV-VI compound, or a Group II-IV-V compound. The second semiconductor material can be ZnO, ZnS, ZnSe, ZnTe, CdO, CdS, CdSe, CdTe, MgO, MgS, MgSe, MgTe, HgO, HgS, HgSe, HgTe, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. The nanocrystal includes a perovskite. The nanocrystal can include a $CsPbCl_3$, a $CsPbBr_3$, or a $CsPbI_3$.

In certain embodiments, the ligand includes a 5-norbornene-2-nonanoate.

In another aspect, a method of preparing a core shell semiconductor nanocrystal composition can include mixing a core nanocrystal, shell precursor material, and an acid, wherein the acid includes a norbornene group and a carboxyl group. In certain embodiments, the core nanocrystal can include a Group II-VI compound, a Group II-V compound, a Group III-VI compound, a Group III-V compound, a Group IV-VI compound, a Group compound, a Group II-IV-VI compound, or a Group II-IV-V compound. The shell material can include ZnO, ZnS, ZnSe, ZnTe, CdO, CdS, CdSe, CdTe, MgO, MgS, MgSe, MgTe, HgO, HgS, HgSe, HgTe, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

In certain embodiments, a method of preparing a MX semiconductor nanocrystal can include adding an M precursor material, an X precursor, and an acid to a solution, wherein the acid includes a norbornene group and a carboxyl group. The MX can include a Group II-VI compound, a Group II-V compound, a Group III-VI compound, a Group III-V compound, a Group IV-VI compound, a Group compound, a Group II-IV-VI compound, or a Group II-IV-V compound. The MX nanocrystal can include ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, or PbTe. The acid can include 5-norbornene-2-nonanoic acid. The solution can include a second acid can include an oleic acid. The solution can include the ratio between 5-norbornene-2-nonanoic acid and oleic acid is 1:3 to 3:1. The MX can include a perovskite. For example, MX can include a $CsPbCl_3$, a $CsPbBr_3$, or a $CsPbI_3$.

Other aspects, embodiments, and features will be apparent from the following description, the drawings, and the claims.

BRIEF DESCRIPTION OF THE DRAWINGS

FIG. 9 shows the process of synthesizing a compound.

FIG. 11 shows the process of synthesizing a compound.

FIG. 13C shows TEM pictures of i) CdSe/ZnS nanocrystals, ii) CdSe/CdS nanocrystals, and iii) InAs/CdSe/ZnS.

FIG. 17A shows nanocrystal-oligo probe targets the sequence on the gene via a secondary sequence; FIG. 17B shows a complex of ssDNA library was engineered with a sequence complimentary to the oligo sequence on nanocrystals, followed by fluorescence in situ hybridization (FISH) experiment to detect target gene.

FIGS. 24A and 24B are graphs depicting absorption and emission spectra of two different 5-norbornene-2-nonanoic-coated PbS nanocrystal samples in chloroform and in water. FIG. 24A shows a PbS sample with emission peak (lambda max) at 1074 nm and PLQY of 15% in water.

FIG. 24B shows a PbS sample with emission peak (lambda max) at 1309 nm and PLQY of 6% in water.

DETAILED DESCRIPTION

Figure 1:
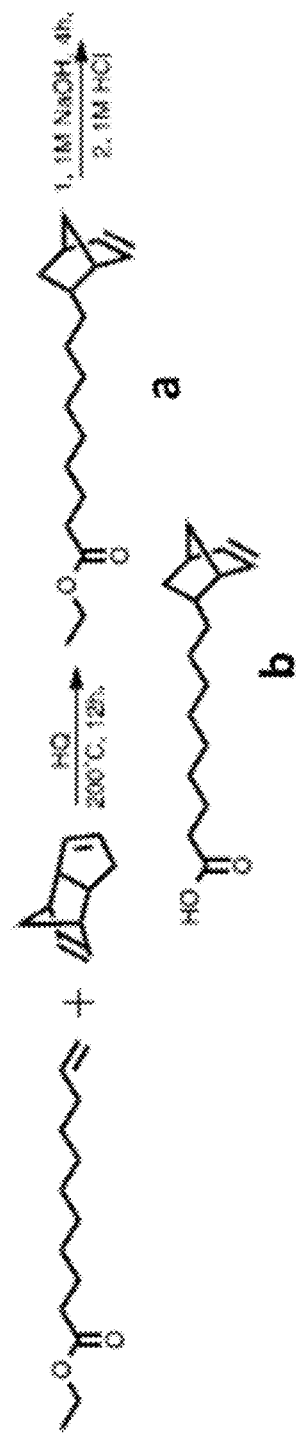
FIG. 1 shows the synthesis of 5-Norbornene-2-nonanoic Acid.

In the last 20 years, the synthesis methods of colloidal nanocrystallites have advanced at an astonishing rate, producing particles that are chemically stable, monodisperse and, in the case of semiconductor quantum dots (nanocrystal), immensely bright. These materials have led to new developments in biological imaging, photovoltaic systems and light emitting devices, among many others fields, and continue to be a topic of intense research and investigation. Hybrid nanomaterials, those composed of an inorganic nanocrystallite linked to a functional organic or biological molecule, have recently emerged as a new class of tools for generating highly efficient devices and targeting or sensing agents for a broad range of advanced applications. Although the quality of colloidal nanocrystallites has increased substantially over the past few years, the synthesis of hybrid nanomaterials remains a challenge today. The main problem lies in transforming the surface chemistry, from that generated by the nanocrystallite synthesis conditions (high boiling-point, hydrophobic solvent environment), to one possessing appropriate functional groups for conjugation and that is compatible with the final intended application. Current methods used to produce hybrid nanomaterials rely on ligand exchange techniques, which are unscalable, expensive and, in some cases, difficult to reproduce.

A key challenge to the synthesis of hybrid nanomaterials has been generating nanocrystals with appropriate functionality for conjugation to a molecule of interest (e.g. IgG, DNA, polymer) or for further derivatization. Even in the presence of other competing ligands, carboxylate groups bind strongly and preferentially to the surface of nanocrystals during particle synthesis. An organic ligand exhibiting a carboxylate group that binds to the nanocrystal, and a norbornene group for conjugation and derivatization can be designed and synthesized. This organic ligand is compatible with a large number of established nanocrystal synthesis conditions, and can be incorporated in addition to, or in direct substitution of oleic acid, the standard carboxylate ligand used in synthesis. In addition, the transition metal salt derivative can also be used to produce nanocrystals.

Quantum dot, with its broad absorption, narrow emission, high quantum yield and exceptional photostability, has drawn a lot of interest for its promising applications in biological imaging researches. Compared to conventional organic fluorophores, nanocrystals have shown advantages in multiple biological applications such as particle tracking and multiplexed imaging. Here, a color series of visible light emitting nanocrystals are developed with nearly unity photoluminescence (PL) quantum yield, symmetric and narrow emission spectral lineshapes (FWHM 20-25 nm) for highly multiplexed imaging. Additionally, InAs/CdSe/ZnS core/shell nanocrystals emitting in the short wavelength infrared (SWIR) region were also synthesized to widen the imaging range. To functionalize these nanocrystals for biological use, a norbornene-bearing organic ligand is developed. The ligand binds strongly to the surface of colloidal nanocrystallites during nanocrystal synthesis, which enables efficient conjugation of hydrophilic ligands via bioorthogonal click reaction between norbornene and tetrazine.

An organic ligand that exhibits a norbornene functional group and binds strongly to the surface of colloidal nanocrystallites can be used during particle synthesis, eliminating the need for ligand exchange and enabling large-scale production of high quality hybrid nanomaterials. The molecule is compatible with state-of-the-art synthesis methods of a large variety of semiconductor nanocrystallites and metal oxide nanoparticles, making this a general method for making derivatizable nanomaterials.

In certain circumstances, the nanoparticles can be a perovskite, for example, a $CsPbBr_3$, or a $CsPbI_3$ material. Perovskite materials have a relatively high solubility product constant and are therefore unstable, to put a handle on the surface is very difficult without using the ligands and methods described herein.

A semiconductor nanocrystal composition can include a semiconductor nanocrystal, and an outer layer including a ligand bound to the nanocrystal, wherein the ligand includes a norbornene group and a carboxyl group. The ligand includes a 5-norbornene-2-nonanoate.

The semiconductor nanocrystal can include a core of a first semiconductor material. The first semiconductor material is a Group II-VI compound, a Group II-V compound, a Group III-VI compound, a Group III-V compound, a Group IV-VI compound, a Group compound, a Group II-IV-VI compound, or a Group II-IV-V compound. The first semiconductor material is ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof.

The semiconductor nanocrystals includes a second semiconductor material overcoated on the first semiconductor material. The first semiconductor material has a first band gap, and the second semiconductor material has a second band gap that is larger than the first band gap. The second semiconductor material is a Group II-VI compound, a Group II-V compound, a Group III-VI compound, a Group III-V compound, a Group IV-VI compound, a Group compound, a Group II-IV-VI compound, or a Group II-IV-V compound. The second semiconductor material is ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

Semiconductor nanocrystals demonstrate quantum confinement effects in their luminescence properties. When semiconductor nanocrystals are illuminated with a primary energy source, a secondary emission of energy occurs at a frequency related to the band gap of the semiconductor material used in the nanocrystal. In quantum confined particles, the frequency is also related to the size of the nanocrystal.

The semiconductor forming the nanocrystals can include a Group II-VI compound, a Group II-V compound, a Group III-VI compound, a Group III-V compound, a Group IV-VI compound, a Group compound, a Group II-IV-VI compound, or a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, $Cd_3As_2$, $Cd_3P_2$ or mixtures thereof.

In general, the method of manufacturing a nanocrystal is a colloidal growth process. See, for example, U.S. Pat. Nos. 6,322,901, 6,576,291, and 7,253,452, and U.S. patent application Ser. No. 12/862,195, filed Aug. 24, 2010, each of which is incorporated by reference in its entirety. Colloidal growth can result when an M-containing compound and an X donor are rapidly injected into a hot coordinating solvent. The coordinating solvent can include an amine. The M-containing compound can be a metal, an M-containing salt, or an M-containing organometallic compound. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. In some circumstances, the growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M-containing compound or X donor, the growth period can be shortened. When adding more M-containing compound or X donor after the initial injection, the addition can be relatively slow, e.g., in several discrete portions added at intervals, or a slow continuous addition. Introducing can include heating a composition including the coordinating solvent and the M-containing compound, rapidly adding a first portion of the X donor to the composition, and slowly adding a second portion of the X donor. Slowly adding the second portion can include a substantially continuous slow addition of the second portion. See, for example, U.S. patent application Ser. No. 13/348,126 which was filed on Jan. 11, 2012, which is incorporated by reference in its entirety.

The M-containing salt can be a non-organometallic compound, e.g., a compound free of metal-carbon bonds. M can be cadmium, zinc, magnesium, mercury, aluminum, gallium, indium, thallium, or lead. The M-containing salt can be a metal halide, metal carboxylate, metal carbonate, metal hydroxide, metal oxide, or metal diketonate, such as a metal acetylacetonate. The M-containing salt is less expensive and safer to use than organometallic compounds, such as metal alkyls. For example, the M-containing salts are stable in air, whereas metal alkyls are generally unstable in air. M-containing salts such as 2,4-pentanedionate (i.e., acetylacetonate (acac)), halide, carboxylate, hydroxide, oxide, or carbonate salts are stable in air and allow nanocrystals to be manufactured under less rigorous conditions than corresponding metal alkyls. In some cases, the M-containing salt can be a long-chain carboxylate salt, e.g., a $C_8$ or higher (such as $C_8$ to $C_{20}$, or $C_{12}$ to $C_{18}$), straight chain or branched, saturated or unsaturated carboxylate salt. Such salts include, for example, M-containing salts of lauric acid, myristic acid, palmitic acid, stearic acid, arachidic acid, palmitoleic acid, oleic acid, linoleic acid, linolenic acid, or arachidonic acid.

Suitable M-containing salts include cadmium acetylacetonate, cadmium iodide, cadmium bromide, cadmium chloride, cadmium hydroxide, cadmium carbonate, cadmium acetate, cadmium myristate, cadmium oleate, cadmium oxide, zinc acetylacetonate, zinc iodide, zinc bromide, zinc chloride, zinc hydroxide, zinc carbonate, zinc acetate, zinc myristate, zinc oleate, zinc oxide, magnesium acetylacetonate, magnesium iodide, magnesium bromide, magnesium chloride, magnesium hydroxide, magnesium carbonate, magnesium acetate, magnesium myristate, magnesium oleate, magnesium oxide, mercury acetylacetonate, mercury iodide, mercury bromide, mercury chloride, mercury hydroxide, mercury carbonate, mercury acetate, mercury myristate, mercury oleate, aluminum acetylacetonate, aluminum iodide, aluminum bromide, aluminum chloride, aluminum hydroxide, aluminum carbonate, aluminum acetate, aluminum myristate, aluminum oleate, gallium acetylacetonate, gallium iodide, gallium bromide, gallium chloride, gallium hydroxide, gallium carbonate, gallium acetate, gallium myristate, gallium oleate, indium acetylacetonate, indium iodide, indium bromide, indium chloride, indium hydroxide, indium carbonate, indium acetate, indium myristate, indium oleate, thallium acetylacetonate, thallium iodide, thallium bromide, thallium chloride, thallium hydroxide, thallium carbonate, thallium acetate, thallium myristate, or thallium oleate.

Prior to combining the M-containing salt with the X donor, the M-containing salt can be contacted with a coordinating solvent to form an M-containing precursor. Typical coordinating solvents include alkyl phosphines, alkyl phosphine oxides, alkyl phosphonic acids, or alkyl phosphinic acids; however, other coordinating solvents, such as pyridines, furans, and amines may also be suitable for the nanocrystal production. Examples of suitable coordinating solvents include pyridine, tri-n-octyl phosphine (TOP) and tri-n-octyl phosphine oxide (TOPO). Technical grade TOPO can be used. The coordinating solvent can include a 1,2-diol or an aldehyde. The 1,2-diol or aldehyde can facilitate reaction between the M-containing salt and the X donor and improve the growth process and the quality of the nanocrystal obtained in the process. The 1,2-diol or aldehyde can be a $C_6$-$C_{20}$ 1,2-diol or a $C_6$-$C_{20}$ aldehyde. A suitable 1,2-diol is 1,2-hexadecanediol or myristol and a suitable aldehyde is dodecanal is myristic aldehyde.

The X donor is a compound capable of reacting with the M-containing salt to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, elemental sulfur, bis(trimethylsilyl) selenide (($TMS)_2Se$), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride (($TMS)_2Te$), sulfur, bis(trimethylsilyl)sulfide (($TMS)_2S$), a trialkyl phosphine sulfide such as (tri-n-octylphosphine) sulfide (TOPS), tris(dimethylamino) arsine, an ammonium salt such as an ammonium halide (e.g., $NH_4Cl$), tris(trimethylsilyl) phosphide (($TMS)_3P$), tris(trimethylsilyl) arsenide (($TMS)_3As$), or tris(trimethylsilyl) antimonide (($TMS)_3Sb$). In certain embodiments, the M donor and the X donor can be moieties within the same molecule.

The X donor can be a compound of formula (I):

$$X(Y(R)_3)_3 \qquad (I)$$

where X is a group V element, Y is a group IV element, and each R, independently, is alkyl, alkenyl, alkynyl, cycloalkyl, cycloalkenyl, heterocyclyl, aryl, or heteroaryl, where each R, independently, is optionally substituted by 1 to 6 substituents independently selected from hydrogen, halo, hydroxy, nitro, cyano, amino, alkyl, cycloalkyl, cycloalkenyl, alkoxy, acyl, thio, thioalkyl, alkenyl, alkynyl, cycloalkenyl, heterocyclyl, aryl, or heteroaryl. See, e.g., provisional U.S. Patent Application No. 61/535,597, filed Sep. 16, 2011, which is incorporated by reference in its entirety.

In some embodiments, X can be N, P, As, or Sb. Y can be C, Si, Ge, Sn, or Pb. Each R, independently, can be alkyl or cycloalkyl. In some cases, each R, independently, can be unsubstituted alkyl or unsubstituted cycloalkyl, for example, a $C_1$ to $C_8$ unsubstituted alkyl or a $C_3$ to $C_8$ unsubstituted cycloalkyl. In some embodiments, X can be P, As, or Sb. In some embodiments, Y can be Ge, Sn, or Pb.

In some embodiments, X can be P, As, or Sb, Y can be Ge, Sn, or Pb, and each R, independently, can be unsubstituted alkyl or unsubstituted cycloalkyl, for example, a $C_1$ to $C_8$ unsubstituted alkyl or a $C_3$ to $C_8$ unsubstituted cycloalkyl. Each R, independently, can be unsubstituted alkyl, for example, a $C_1$ to $C_6$ unsubstituted alkyl.

Alkyl is a branched or unbranched saturated hydrocarbon group of 1 to 30 carbon atoms, such as methyl, ethyl, n-propyl, isopropyl, n-butyl, isobutyl, t-butyl, octyl, decyl, tetradecyl, hexadecyl, eicosyl, tetracosyl and the like. Optionally, an alkyl group can be substituted by 1 to 6 substituents independently selected from hydrogen, halo, hydroxy, nitro, cyano, amino, alkyl, cycloalkyl, cycloalkenyl, alkoxy, acyl, thio, thioalkyl, alkenyl, alkynyl, cycloalkenyl, heterocyclyl, aryl, or heteroaryl. Optionally, an alkyl group can contain 1 to 6 linkages selected from —O—, —S—, -M- and —NR— where R is hydrogen, or $C_1$-$C_8$ alkyl or lower alkenyl. Cycloalkyl is a cyclic saturated hydrocarbon group of 3 to 10 carbon atoms, such as cyclopropyl, cyclobutyl, cyclopentyl, cyclohexyl, cycloheptyl, cyclooctyl, and the like. A cycloalkyl group can be optionally substituted, or contain linkages, as an alkyl group does.

Alkenyl is a branched or unbranched unsaturated hydrocarbon group of 2 to 20 carbon atoms containing at least one double bond, such as vinyl, propenyl, butenyl, and the like. Cycloalkenyl is a cyclic unsaturated hydrocarbon group of 3 to 10 carbon atoms including at least one double bond. An alkenyl or cycloalkenyl group can be optionally substituted, or contain linkages, as an alkyl group does.

Alkynyl is a branched or unbranched unsaturated hydrocarbon group of 2 to 20 carbon atoms containing at least one triple bond, such as ethynyl, propynyl, butynyl, and the like. An alkynyl group can be optionally substituted, or contain linkages, as an alkyl group does.

Heterocyclyl is a 3- to 10-membered saturated or unsaturated cyclic group including at least one ring heteroatom selected from 0, N, or S. A heterocyclyl group can be optionally substituted, or contain linkages, as an alkyl group does.

Aryl is a 6- to 14-membered carbocyclic aromatic group which may have one or more rings which may be fused or unfused. In some cases, an aryl group can include an aromatic ring fused to a non-aromatic ring. Exemplary aryl groups include phenyl, naphthyl, or anthracenyl. Heteroaryl is a 6- to 14-membered aromatic group which may have one or more rings which may be fused or unfused. In some cases, a heteroaryl group can include an aromatic ring fused to a non-aromatic ring. An aryl or heteroaryl group can be optionally substituted, or contain linkages, as an alkyl group does.

For given values of X and R, varying Y can produce X donors having varying reactivity, e.g., different reaction kinetics in the formation of semiconductor nanocrystals. Thus, the reactivity of tris(trimethylsilyl)arsine in the formation of nanocrystals can be different from the reactivity of tris(trimethylstannyl)arsine or tris(trimethylplumbyl)arsine in an otherwise similar reaction. Likewise, for given values of X and Y, variations in R can produce variations in reactivity. In the formation of nanocrystals, reactivity (and particularly reaction kinetics) can affect the size and size distribution of the resulting population of nanocrystals. Thus, selection of precursors having appropriate reactivity can aid in forming a population of nanocrystals having desirable properties, such as a particular desired size and/or a narrow size distribution.

Examples of X donors of formula (I) include: tris(trimethylgermyl)nitride, $N(Ge(CH_3)_3)_3$; tris(trimethylstannyl) nitride, $N(Sn(CH_3)_3)_3$; tris(trimethylplumbyl)nitride, $N(Pb(CH_3)_3)_3$; tris(trimethylgermyl)phosphide, $P(Ge(CH_3)_3)_3$; tris(trimethylstannyl) phosphide, $P(Sn(CH_3)_3)_3$; tris(trimethylplumbyl) phosphide, $P(Pb(CH_3)_3)_3$; tris(trimethylgermyl)arsine, $As(Ge(CH_3)_3)_3$; tris(trimethylstannyl)arsine, $As(Sn(CH_3)_3)_3$; tris(trimethylplumbyl)arsine, $As(Pb(CH_3)_3)_3$; tris(trimethylgermyl)stibine, $Sb(Ge(CH_3)_3)_3$; tris(trimethylstannyl)stibine, $Sb(Sn(CH_3)_3)_3$; and tris(trimethylplumbyl)stibine, $Sb(Pb(CH_3)_3)_3$.

A coordinating solvent can help control the growth of the nanocrystal. The coordinating solvent is a compound having a donor lone pair that, for example, has a lone electron pair available to coordinate to a surface of the growing nanocrystal. Solvent coordination can stabilize the growing nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of suitable coordinating solvents include pyridine, tri-n-octyl phosphine (TOP), tri-n-octyl phosphine oxide (TOPO) and tris-hydroxylpropylphosphine (tHPP). Technical grade TOPO can be used.

The nanocrystal manufactured from an M-containing salt can grow in a controlled manner when the coordinating solvent includes an amine. The amine in the coordinating solvent can contribute to the quality of the nanocrystal obtained from the M-containing salt and X donor. The coordinating solvent can a mixture of the amine and an alkyl phosphine oxide. The combined solvent can decrease size dispersion and can improve photoluminescence quantum yield of the nanocrystal. The amine can be a primary alkyl amine or a primary alkenyl amine, such as a C2-C20 alkyl amine, a C2-C20 alkenyl amine, preferably a C8-C18 alkyl amine or a C8-C18 alkenyl amine. For example, suitable amines for combining with tri-octylphosphine oxide (TOPO) include 1-hexadecylamine, or oleylamine. When the 1,2-diol or aldehyde and the amine are used in combination with the M-containing salt to form a population of nanocrystals, the photoluminescence quantum efficiency and the distribution of nanocrystal sizes are improved in comparison to nanocrystals manufactured without the 1,2-diol or aldehyde or the amine.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX (e.g., for a II-VI semiconductor material) or $M_3X_2$ (e.g., for a II-V semiconductor material), where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, both CdSe and CdS can be tuned in the visible region and InAs can be tuned in the infrared region. $Cd_3As_2$ can be tuned from the visible through the infrared.

A population of nanocrystals can have a narrow size distribution. The population can be monodisperse and can exhibit less than a 15% rms deviation in diameter of the nanocrystals, preferably less than 10%, more preferably less than 5%. Spectral emissions in a narrow range of between 10 and 100 nm full width at half max (FWHM) can be observed. Semiconductor nanocrystals can have emission quantum efficiencies (i.e., quantum yields, QY) of greater than 2%, 5%, 10%, 20%, 40%, 60%, 70%, 80%, or 90%. In some cases, semiconductor nanocrystals can have a QY of at least 90%, at least 91%, at least 92%, at least 93%, at least 94%, at least 95%, at least 96%, at least 97%, at least 97%, at least 98%, or at least 99%.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average diameter and choosing the proper composition of the semiconducting material, the emission spectra of the nanocrystals can be tuned continuously over the wavelength range of 300 nm to 5 microns, or from 400 nm to 800 nm for CdSe and CdTe. The nanocrystal has a diameter of less than 150 Å. A population of nanocrystals has average diameters in the range of 15 Å to 125 Å.

The core can have an overcoating on a surface of the core. The overcoating can be a semiconductor material having a composition different from the composition of the core. The overcoat of a semiconductor material on a surface of the nanocrystal can include a Group II-VI compound, a Group II-V compound, a Group III-VI compound, a Group III-V compound, a Group IV-VI compound, a Group compound, a Group II-IV-VI compound, and a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, $Cd_3As_2$, $Cd_3P_2$ or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating can be between 1 and 10 monolayers thick.

Shells are formed on nanocrystals by introducing shell precursors at a temperature where material adds to the surface of existing nanocrystals but at which nucleation of new particles is rejected. In order to help suppress nucleation and anisotropic elaboration of the nanocrystals, selective ionic layer adhesion and reaction (SILAR) growth techniques can be applied. See, e.g., U.S. Pat. No. 7,767,260, which is incorporated by reference in its entirety. In the SILAR approach, metal and chalcogenide precursors are added separately, in an alternating fashion, in doses calculated to saturate the available binding sites on the nanocrystal surfaces, thus adding one-half monolayer with each dose. The goals of such an approach are to: (1) saturate available surface binding sites in each half-cycle in order to enforce isotropic shell growth; and (2) avoid the simultaneous presence of both precursors in solution so as to minimize the rate of homogenous nucleation of new nanoparticles of the shell material.

Figure 21:
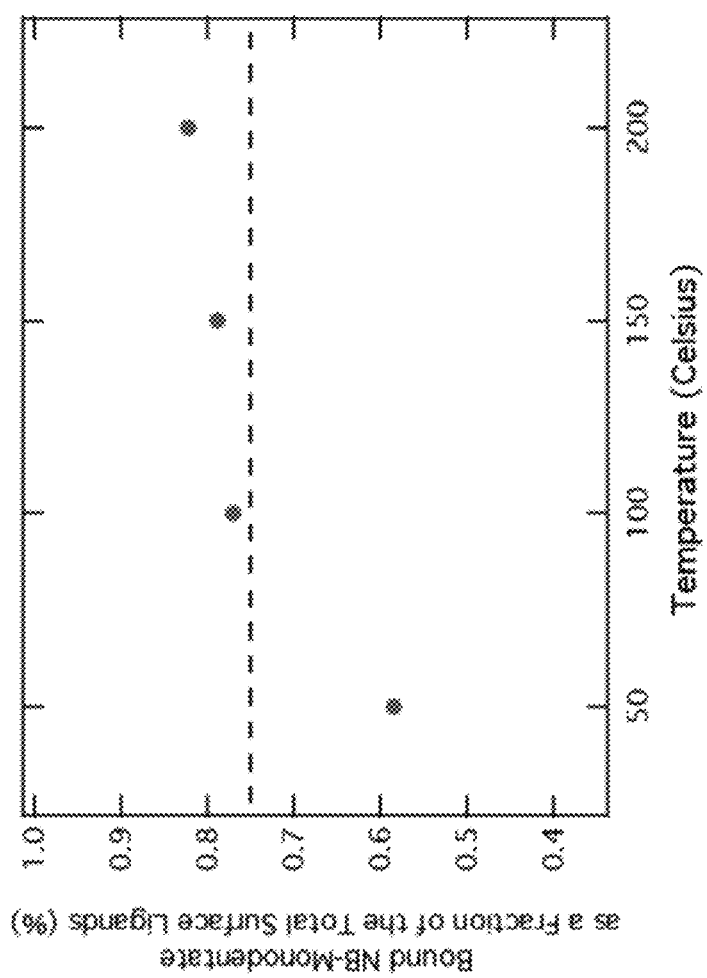
FIG. 21 is a graph showing the total number of 5-norbornene-2-nonanoic acid ligands bound to nanocrystals as a fraction of the total carboxylate ligands on the surface after incubation for 1 hour at various temperatures. The dash line represents the fraction in solution, which is equivalent to a 5-norbornene-2-nonanoic acid to oleic acid ratio of 3:1.

One of the strategies for obtaining derivatizable nanocrystals involves the addition of 5-norbornene-2-nonanoic acid to the growth solution during synthesis, where it competes with the native ligands for binding until the system reaches equilibrium. The ability to design an effective and reliable method for functionalization relies on understanding of the conditions that drive this exchange reaction to completion. The extent of 5-norbornene-2-nonanoic acid binding to CdSe—CdS nanocrystals after incubating at various temperatures and immediately after the CdS shell growth was studied. $^1$H NMR spectroscopy was used to characterize the ligands bound to the surface and determine the degree of functionalization on nanocrystals samples that have been purified using tangential flow filtration. As shown in FIG. 21, the amount of 5-norbornene-2-nonanoic acid ligand on the nanocrystals, expressed as a fraction of the total number of carboxylate ligands on the surface, reaches equilibrium—that is to say, the ratio of 5-norbornene-2-nonanoic acid to oleic acid on the surface matches the ratio in solution—when the new ligand is added at 100° C. or a higher temperature and is allowed to react for one hour. The binding of the 5-norbornene-2-nonanoic acid is favored over that of oleic acid at high temperatures, as indicated by a surface ligand ratio of 5-norbornene-2-nonanoic acid to oleic acid that is higher than that in solution. This can be due to a tighter packing and, thus, a higher level of self-attraction between 5-norbornene-2-nonanoic acid as compared to oleic acid, whose cis configuration limits its ability to form dense structures. Using these results as guidelines, a method to functionalize nanocrystals with high reaction temperatures that employs an incubation temperature of 150° C. for one hour was developed and can be used to prepare water-soluble CdSe—CdS. Adding the 5-norbornene-2-nonanoic acid to the growth solution does not alter the size, the shape, nor the size-distribution of the nanocrystals obtained after synthesis.

In the SILAR approach, it can be beneficial to select reagents that react cleanly and to completion at each step. In other words, the reagents selected should produce few or no reaction by-products, and substantially all of the reagent added should react to add shell material to the nanocrystals. Completion of the reaction can be favored by adding substoichiometric amounts of the reagent. In other words, when less than one equivalent of the reagent is added, the likelihood of any unreacted starting material remaining is decreased.

The quality of core-shell nanocrystals produced (e.g., in terms of size monodispersity and QY) can be enhanced by using a constant and lower shell growth temperature. Alternatively, high temperatures may also be used. In addition, a low-temperature or room temperature "hold" step can be used during the synthesis or purification of core materials prior to shell growth.

The outer surface of the nanocrystal can include a layer of compounds derived from the coordinating agent used during the growth process. The surface can be modified by repeated exposure to an excess of a competing coordinating group to form an overlayer. For example, a dispersion of the capped nanocrystal can be treated with a coordinating organic compound, such as pyridine, to produce crystals which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal. Nanocrystal coordinating compounds are described, for example, in U.S. Pat. No. 6,251,303, which is incorporated by reference in its entirety.

Monodentate alkyl phosphines (and phosphine oxides; the term phosphine below will refer to both) can passivate nanocrystals efficiently. When nanocrystals with conventional monodentate ligands are diluted or embedded in a non-passivating environment (i.e., one where no excess ligands are present), they tend to lose their high luminescence. Typical are an abrupt decay of luminescence, aggregation, and/or phase separation. In order to overcome these limitations, polydentate ligands can be used, such as a family of polydentate oligomerized phosphine ligands. The polydentate ligands show a high affinity between ligand and nanocrystal surface. In other words, they are stronger ligands, as is expected from the chelate effect of their polydentate characteristics.

In general, a ligand for a nanocrystal can include a first monomer unit including a first moiety having affinity for a surface of the nanocrystal, a second monomer unit including a second moiety having a high water solubility, and a third monomer unit including a third moiety having a selectively reactive functional group or a selectively binding functional group. In this context, a "monomer unit" is a portion of a polymer derived from a single molecule of a monomer. For example, a monomer unit of poly(ethylene) is —$CH_2CH_2$—, and a monomer unit of poly(propylene) is —$CH_2CH(CH_3)$—. A "monomer" refers to the compound itself, prior to polymerization, e.g., ethylene is a monomer of poly(ethylene) and propylene of poly(propylene).

A selectively reactive functional group is one that can form a covalent bond with a selected reagent under selected conditions. One example of a selectively reactive functional group is a primary amine, which can react with, for example, a succinimidyl ester in water to form an amide bond. A selectively binding functional group is a functional group that can form a noncovalent complex with a selective binding counterpart. Some well-known examples of selectively binding functional groups and their counterparts include biotin and streptavidin; a nucleic acid and a sequence-complementary nucleic acid; FK506 and FKBP; or an antibody and its corresponding antigen. See, e.g., U.S. Pat. No. 7,160,613, which is incorporated by reference in its entirety.

A moiety having high water solubility typically includes one or more ionized, ionizable, or hydrogen bonding groups, such as, for example, an amine, an alcohol, a carboxylic acid, an amide, an alkyl ether, a thiol, or other groups known in the art. Moieties that do not have high water solubility include, for example, hydrocarbyl groups such as alkyl groups or aryl groups, haloalkyl groups, and the like. High water solubility can be achieved by using multiple instances of a slightly soluble group: for example, diethyl ether is not highly water soluble, but a poly(ethylene glycol) having multiple instances of a CH2 O CH2 alkyl ether group can be highly water soluble.

For example, the ligand can include a polymer including a random copolymer. The random copolymer can be made using any method of polymerization, including cationic, anion, radical, metathesis or condensation polymerization, for example, living cationic polymerization, living anionic polymerization, ring opening metathesis polymerization, group transfer polymerization, free radical living polymerization, living Ziegler-Natta polymerization, or reversible addition fragmentation chain transfer (RAFT) polymerization.

In some cases, M belongs to group II and X belongs to group VI, such that the resulting semiconductor nanocrystal includes a II-VI semiconductor material. For example, the M-containing compound can be a cadmium-containing compound and the X donor can be a selenium donor or an sulfur donor, such that the resulting semiconductor nanocrystal includes a cadmium selenide semiconductor material or a cadmium sulfide semiconductor material, respectively.

The particle size distribution can be further refined by size selective precipitation with a poor solvent for the nanocrystals, such as methanol/butanol as described in U.S. Pat. No. 6,322,901. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean diameter, preferably 10% rms deviation or less, and more preferably 5% rms deviation or less.

More specifically, the coordinating ligand can have the formula:

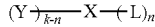

wherein k is 2, 3 or 5, and n is 1, 2, 3, 4 or 5 such that k-n is not less than zero; X is O, S, S=O, $SO_2$, Se, Se=O, N, N=O, P, P=O, As, or As=O; each of Y and L, independently, is aryl, heteroaryl, or a straight or branched $C_{2-12}$ hydrocarbon chain optionally containing at least one double bond, at least one triple bond, or at least one double bond and one triple bond. The hydrocarbon chain can be optionally substituted with one or more $C_{1-4}$ alkyl, $C_{2-4}$ alkenyl, $C_{2-4}$ alkynyl, $C_{1-4}$ alkoxy, hydroxyl, halo, amino, nitro, cyano, $C_{3-5}$ cycloalkyl, 3-5 membered heterocycloalkyl, aryl, heteroaryl, $C_{1-4}$ alkylcarbonyloxy, $C_{1-4}$ alkyloxycarbonyl, $C_{1-4}$ alkylcarbonyl, or formyl. The hydrocarbon chain can also be optionally interrupted by —O—, —S—, —N($R^a$)—, —N($R^a$)—C(O)—O—, —O—C(O)—N($R^a$)—, —N($R^a$)—C(O)—N($R^b$)—, —O—C(O)—O—, —P($R^a$)—, or —P(O)($R^a$)—. Each of $R^a$ and $R^b$, independently, is hydrogen, alkyl, alkenyl, alkynyl, alkoxy, hydroxylalkyl, hydroxyl, or haloalkyl.

A suitable coordinating ligand can be purchased commercially or prepared by ordinary synthetic organic techniques, for example, as described in J. March, *Advanced Organic Chemistry*, which is incorporated by reference in its entirety.

Transmission electron microscopy (TEM) can provide information about the size, shape, and distribution of the nanocrystal population. Powder X-ray diffraction (XRD) patterns can provide the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum.

Advantages and improvements of using an organic ligand having a norbornene functional group includes: large-scale synthesis of functional nanocrystals, >100 nmol compared to 1-2 nmols using ligand exchange; one-pot synthesis strategy makes this method easy to implement in large scale operations; particles retain their compact size; particles retain their native optical properties, and that particles are highly stable. For example, CdS/CdS nanocrystals disperse in phosphate-buffered saline ("PBS"), using the aforementioned method, are stable after 20 days and counting at RT and ambient atmosphere.

A color series of nanocrystals were synthesized with photoluminescence emission ranging from visible to short-wavelength infrared region. A universal ligand with a norbornene group was synthesized to replace the native ligand on nanocrystal and enable facile attachment of hydrophilic PEG segment via norbornene-tetrazine biorthogonal click chemistry. The resulting water soluble nanocrystal has a compact size and can be easily modified with single strand DNA oligos. In vitro hybridization test with complimentary DNA oligo sequences showed the successful conjugation of DNA oligos to nanocrystal and high hybridization efficiency of nanocrystal-oligo. These color series of water soluble nanocrystals are promising candidate probes for highly multiplexed imaging in biological applications.

Example

All chemicals were obtained from Sigma Aldrich and used as received unless otherwise noted.

5-Norbornene-2-nonanoic Acid (b)

FIG. 1 shows the synthesis of 5-Norbornene-2-nonanoic Acid. Dicyclopentadiene (15.73 g 0.119 mol), ethyl undecylenoate (30.30 g, 0.143 mol) and hydroquinone (39.3 mg, 0.36 mmol) were added to a 65 mL pressure vessel. The temperature was raised to 200° C. and the sample was left to react overnight under constant stirring. The resulting oil was cooled to room temperature and then transferred to a distillation apparatus. The solution was degassed at 60° C. for 1 hour under vacuum (200 mTorr) and vacuum distilled. A fraction containing (a) with vapor temperature of 120-130° C. was collected, allowed to reach room temperature and let to rest for 4 hours. The solution was subsequently filtered through a fine-fit Buchner filter to remove solid impurities. The filtrate was collected and stored at 4° C. overnight to induce impurities in solution to precipitate. A second filtration step yields a as a clear oil. (7.69 g, ρ0.977 g/mL)

Figure 2:
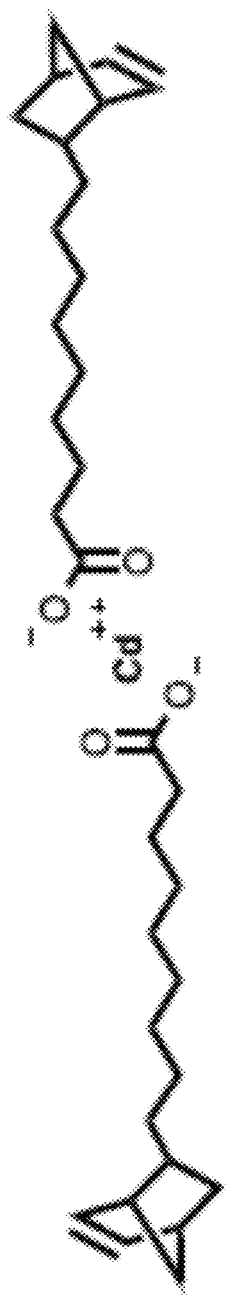
FIG. 2 shows structure of Cadmium 5-Norbornene-2-nonanoate.

To a 1M NaOH solution in methanol (105 mL), a (6.97 mL, 0.024 mol) was added dropwise and the resulting solution was left stirring at room temperature for 4 hours. Unreacted materials were then extracted away with hexanes (150 mL, 3×) and discarded. The methanol phase was acidified to pH 3 using a 1M HCl aqueous solution and the product extracted into hexanes (150 mL, 3×). The hexanes layer was dried over sodium sulfate overnight and subsequently evaporated in vacuo to yield the named compound (b) as a white solid. (2.8237 g 8.9% Overall yield) FTMS: [$C_{16}H_{26}O_2$—H] requires 249.1860 m/z; found 249.1856 m/z Cadmium 5-Norbornene-2-nonanoate FIG. 2 shows structure of Cadmium 5-Norbornene-2-nonanoate. To a three neck round bottom flask equipped with a condenser and a thermocouple, b (2.00 g, 0.008 mol) and cadmium oxide (0.171 g, 0.001 mol) were added, and the resulting mixture was degassed at 100° C. for 1 hour at constant stirring under vacuum. The flask was refilled with $N_2$ and the solution heated up to 150° C. and kept at that temperature for 30 minutes, followed by a temperature increase to 160° C. for 1 hour. The solution was then cooled to 100° C. and degassed for 30 minutes under vacuum to remove the water that is generated over the course of the reaction. The solution is heated a second time up to 160° C. for 1 hour, cooled to 100° C. and degassed for 30 minutes under vacuum. Diphenyl ether (2.75 mL) was added to the reaction flask and the mixture filtered through a 0.45 um PTFE membrane to yield a clear light-yellow solution that is stored under $N_2$ atmosphere and solidifies at room temperature.

CdSe Core CdS Shell Quantum Dots Capped with Norbornene

Wurtzite-CdSe cores were synthesized according to a literature method. See, for example, Carbone, L. et al., Nano Lett 7, 2942-2950 (2007), which is incorporated by reference in its entirety. To grow the functional shell, an overcoating procedure from Chen et al. was modified and used. See, for example, Chen O. et al., *Nature Materials* 2013, 12: 445-451, which is incorporated by reference in its entirety. About 100 nmol CdSe in hexane solution was added to a mixture of 1-octadecene (ODE, 3 ml) and oleylamine (OAm, 3 ml). The solution was degassed at room temperature for 1 hour and heated up to 310° C. under nitrogen flow. During the heating, when it reached 240° C., a desired amount of cadmium (II) oleate (Cd-oleate, diluted in 4 mL ODE) and octanethiol (1.2 equivalent amounts refer to Cd-oleate, diluted in 4 mL ODE) began to be injected dropwise into the growth solution at a rate of 2 mL/hr using a syringe pump. After the infusion, the solution was cooled down to 150° C., and a solution of 2 (2 g, dissolved in 3 ml ODE) was injected. The solution was held at 150° C. for 1 hour. The resulting CdSe/CdS-Norbornene nanocrystals were precipitated by adding acetone and redispersed in hexane. The particles were further purified by precipitation-redispersion for one more time and finally suspended in ~5 ml chloroform.

Figure 3:
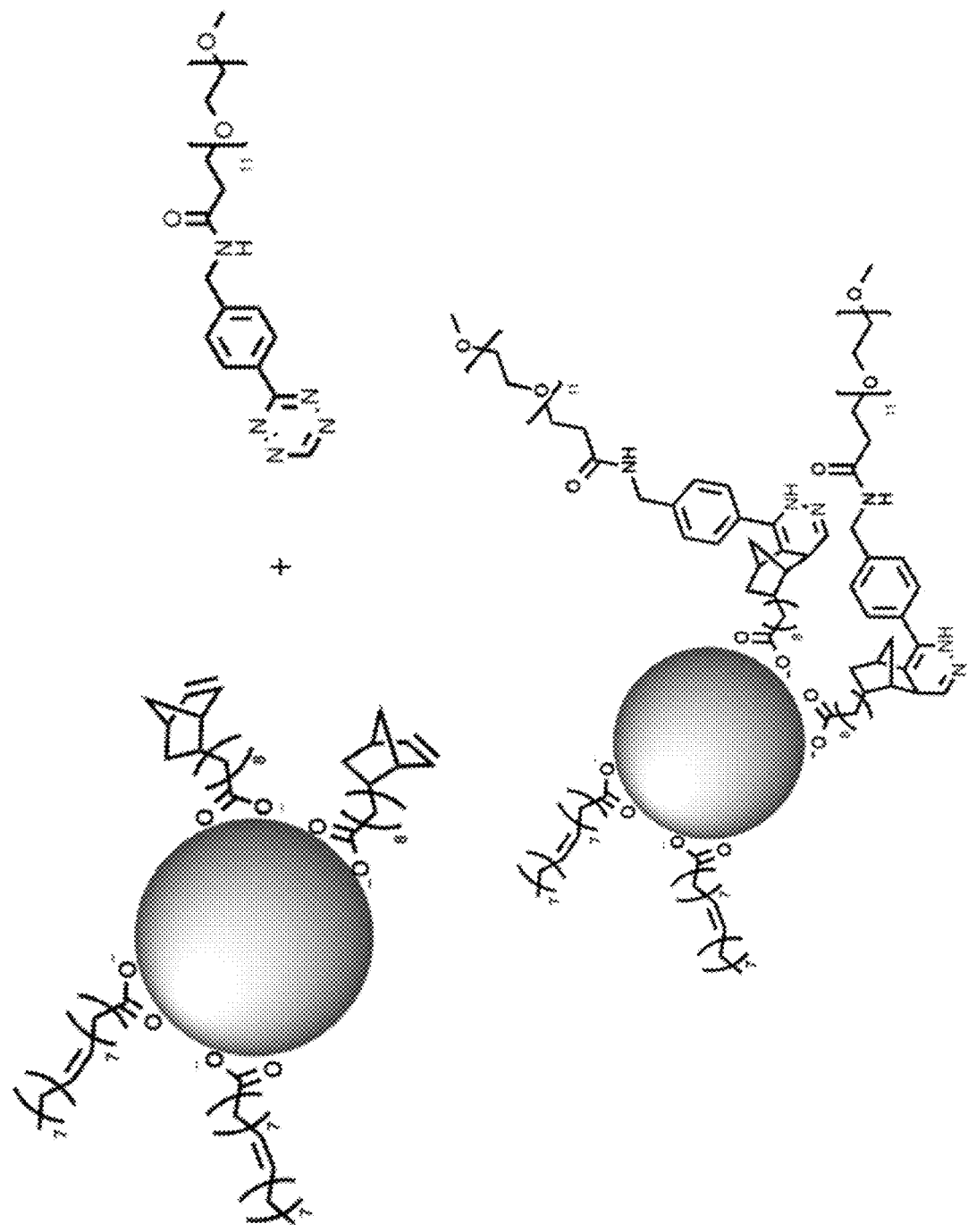
FIG. 3 shows the preparation of water-soluble CdSe/CdS nanocrystals for biological imaging using a tetrazine-$PEG_{550}$ molecule.

FIG. 3 shows one utility of the functional nanocrystals generated through this method, by preparing water-soluble CdSe/CdS nanocrystals for biological imaging using a tetrazine-PEG$_{550}$ molecule.

Temperature Stability of 5-norbornene-2-nonanoic Acid

Figure 4:
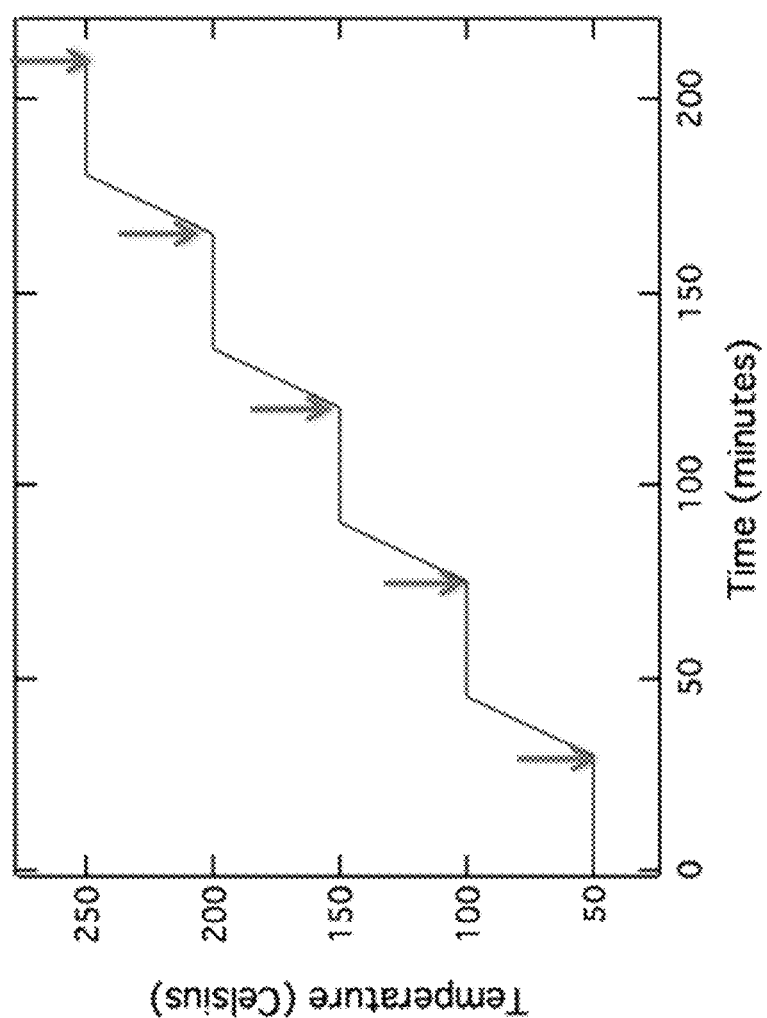
FIG. 4 shows the thermal equilibrium of the solution.
Figure 5:
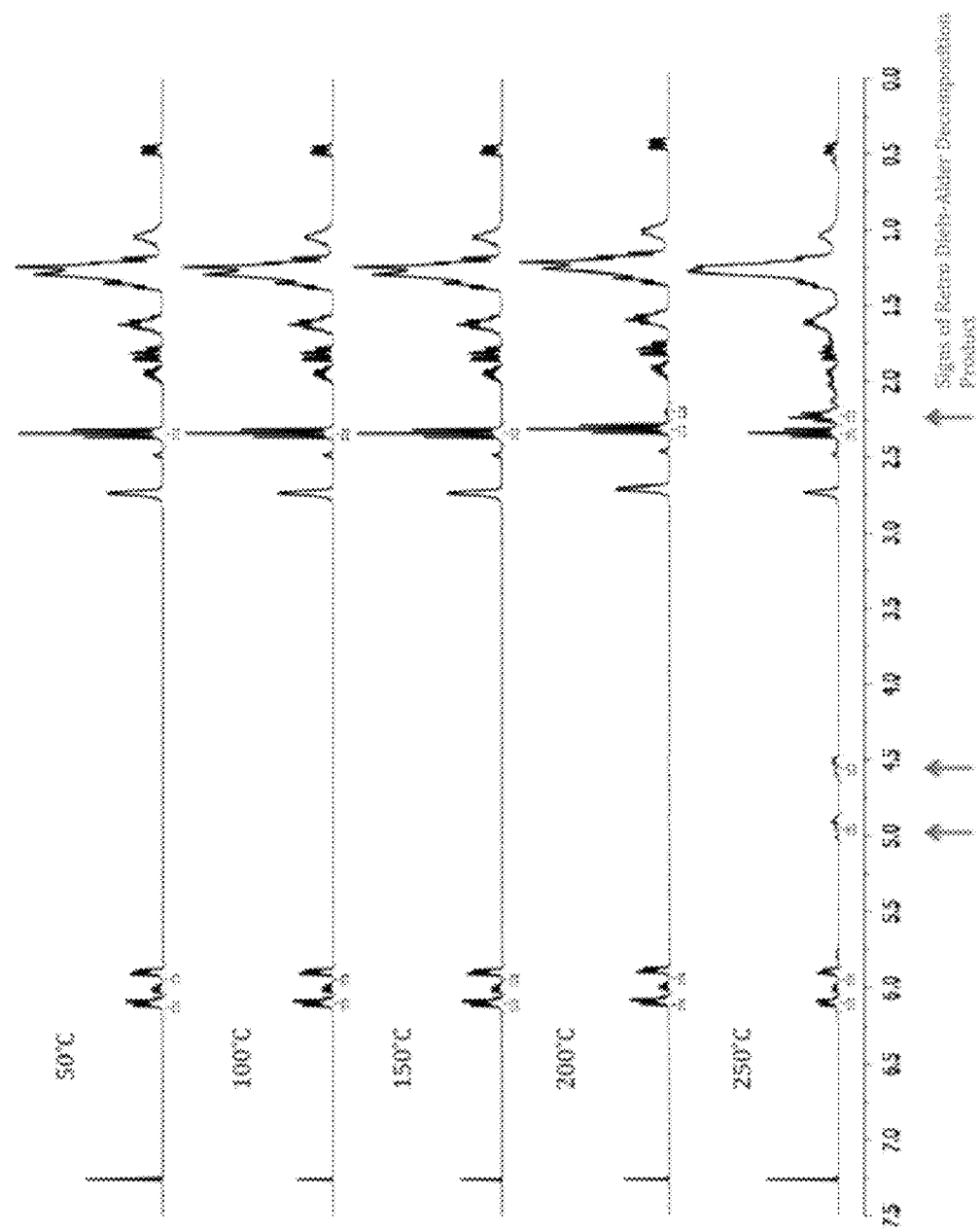
FIG. 5 shows the NMR spectrum of 5-norbornene-2-nonanoic acid at different temperatures.
Figure 6:
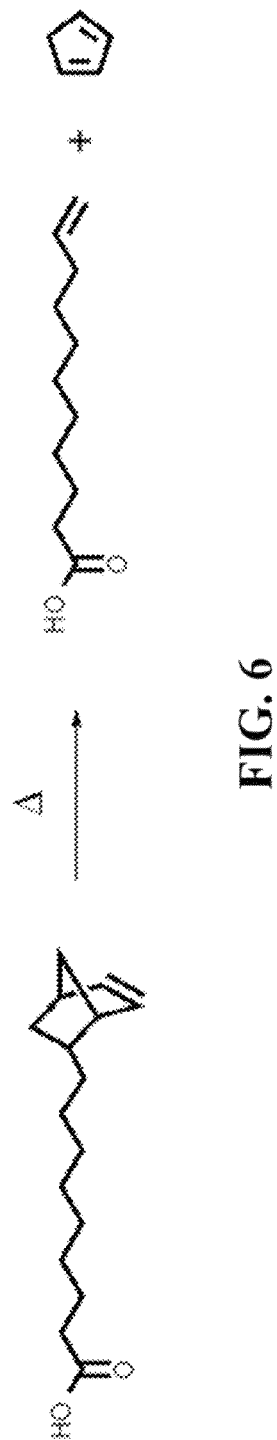
FIG. 6 shows a Retro-Diels-Alder reaction.
Figure 7:
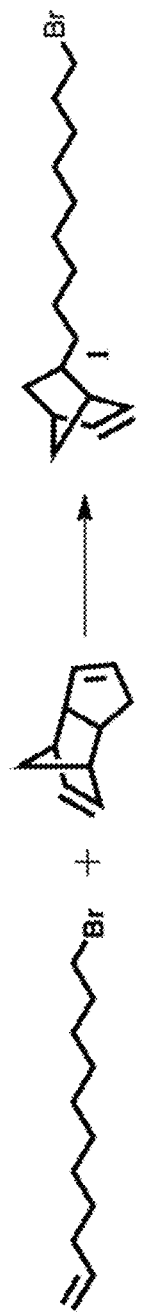
FIG. 7 shows the process of synthesizing a compound.
Figure 8:
FIG. 8 shows the process of synthesizing a compound.
Figure 10:
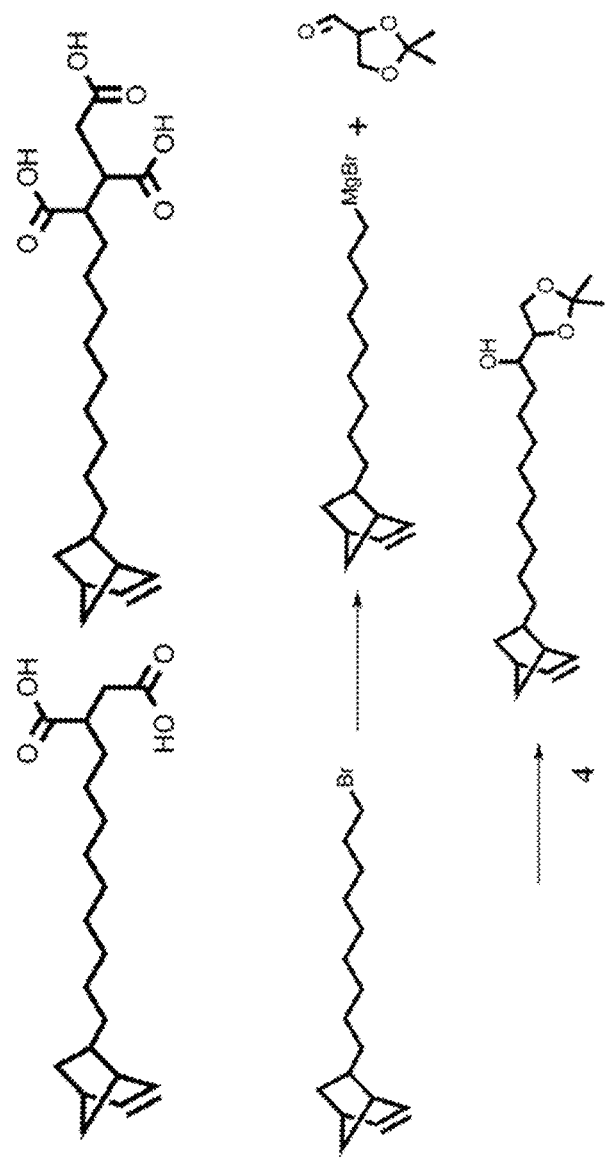
FIG. 10 shows the process of synthesizing compounds.

An ideal organic ligand displays a functional group that is compatible with state-of-the-art synthesis methods, physically stable (i.e. a liquid in solution during synthesis), and chemically stable. The thermal stability of the 5-norbornene-2-nonanoic acid was examined using the following experiment: Five grams of 5-norbornene-2-nonanoic acid were weighted and placed into a three neck round bottom flask connected to a condenser and a thermocouple. The sample was degassed at high vacuum for one hour. The temperature was raised stepwise, each step corresponding to 50° C. increase. In every step, the solution was allowed to reach and kept at thermal equilibrium for 30 minutes (FIG. 4). Then, an aliquot was taken, which was analyzed using NMR spectroscopy. This experiment reveled that 5-norbornene-2-nonanoic acid is thermally stable at temperatures less than and equal to 150° C., and displays very minor signs of decomposition visible in the NMR spectrum around 2.25 ppm at 200° C. (FIG. 5). A possible source of instability at temperatures greater than 150° C. is the retro-Diels-Alder reaction. (FIG. 6)

Based on the thermal stability of the 5-norbornene-2-nonanoic acid, two distinct general methods can be used to produce norbornene functionalized nanoparticles: 1) For nanoparticles synthesis with reaction temperatures of 200° C. or less; 2) for nanoparticles synthesis with reaction temperatures above 200° C.

1) For Nanoparticles Synthesis with Reaction Temperatures of 200° C. or Less

For nanoparticles synthesis with reaction temperatures of 200° C. or less, a complete or partial, direct substitution of 5-norbornene-2-nonanoic acid for oleic acid is used to prepare metal carboxylate precursor, and/or as solvent during particle growth.

The synthesis of cesium lead halide perovskites bearing norbornene functional groups was performed using a modified version of the procedure described in Nano Lett., 2015, 15 (6), pp 3692-3696 by Protesescu, et al., which is incorporated by reference in its entirety. An equimolar amount of 5-Norbornene-2-nonanoic Acid was used in place of oleic acid during precursor synthesis and particle growth.

Preparation of Cs-Carboxylate: $Cs_2CO_3$ (0.814 g) was loaded into 100 mL 3-neck flask along with octadecene (40 mL) and 5-norbornene-2-nonanoic acid (2.0 g), dried for 1 h at 120° C., and then heated under $N_2$ to 150° C. until all $Cs_2CO_3$ reacted with 5-Norbornene-2-nonanoic Acid. Synthesis of $CsPbX_3$ NCs: Octadecene (5 mL) and $PbX_2$, such as $PbI_2$ (0.087 g), $PbBr_2$ (0.069 g), $PbCl_2$ (0.052 g) or their mixtures were loaded into a 25 mL 3-neck flask and dried under vacuum for 1 h at 120° C. Dried oleylamine (0.5 mL) and dried 5-norbornene-2-nonanoic acid (0.4 g) were injected at 120° C. under $N_2$. After complete solubilization of a $PbX_2$ salt, the temperature was raised to 140-200° C. and Cs-carboxylate solution (0.4 mL, 0.125 M in octadecene, prepared as described above) was quickly injected and, 5 s later, the reaction mixture was cooled by the ice-water bath.

The synthesis of lead chalcogenides bearing norbornene functional groups followed an in-house modified procedure derived from Hines, et al. *Adv. Mater.* 15, 1844-1849 (2003), and described in Chuang, et al. *Nature Materials.* 2014, 13, 796-801, which is incorporated by reference in its entirety. In the following procedure a mixture of 5-norbornene-2-nonanoic acid and oleic acid is used, ranging from 0-75% 5-norbornene-2-nonanoic acid. A higher fraction of oleic acid ~50% mol/mol is required to effectively disperse large-sized nanocrystallites in hexanes. This constraint most likely results from a tighter packing structure on the surface of the nanocrystallite when using 5-norbornene-2-nonanoic acid than when using oleic acid, and it may be addressed by constructing a norbornene acid ligand with a longer aliphatic chain.

Lead acetate (0.612 mg) was dissolved in 0.67 g of 5-norbornene-2-nonanoic acid, 0.28 mL of oleic acid and 16 mL of 1-octadecene at 100° C. The solution was degassed for 2 h. and then heated to 150° C. under nitrogen. The sulfur precursor was prepare separately by mixing 0.169 mL of hexamethyldisilathiane and 8 mL of 1-octadecene. The reaction was initiated by the rapid injection of the sulfur precursor into the lead precursor solution. After synthesis, the solution was transferred into a nitrogen-filled glovebox. The nanocrystals were purified by adding a mixture of methanol and butanol, followed by centrifugation.

5-norbornene-2-nonanoic acid can also be used in other synthesis methods that utilize $PbCl_2$ and PbO precursors to make PbS nanocrystallites. PbS nanocrystals can be coated with a monolayer of CdS using the cadmium 5-norbornene-2-nonanoate salt through cation exchange reaction. FIGS. 24A and 24B show the absorption and emission spectra of two representative PbS samples of different sizes, before and after dispersing in water. The data demonstrate that the water solubilization process keeps the main optical features in the spectra mostly intact.

2) For Nanoparticles Synthesis with Reaction Temperatures Above 200° C.

FIG. 7 to FIG. 11 shows the process of synthesizing different compounds. For nanoparticles synthesis with reaction temperatures above 200° C., the reaction temperature is lowered to 150° C. after nanocrystal growth, and an excess of 5-norbornene-2-nonanoic acid is added to the reaction mixture. The 5-norbornene-2-nonanoic acid, then, binds competitively to the surface of the nanocrystal, together with the oleic acid present in solution.

Such aforementioned procedure can be used for the synthesis of CdSe core/CdS shell nanocrystallites. This method can also synthesize CdSe core/CdS shell nanorods, and InAs core/CdSe shell/CdS shell nanocrystallites coated with norbornene.

Dicyclopentadiene (12.559 g, 0.095 mol), 11-bromo-1-undecene (25 mL, 0.114 mol) and hydroquinone (32 mg, 0.29 mmol) were added to a 65 mL pressure vessel. The temperature was raised to 200° C. and the sample was left to react overnight under constant stirring. The resulting oil was cooled to room temperature and then transferred to a distillation apparatus. The solution was degassed at 60° C. for 1 hour under vacuum (200 mTorr) and vacuum distilled.

A fraction ($2^{nd}$) containing (1) with vapor temperature of 110-115° C. was collected. The distillate was stored at 4° C. overnight to induce impurities in solution to precipitate and subsequently filtered through a fine-frit Hirsch filter to remove solid impurities. A second filtration step after 24 h at 4° C. yields 1 as a clear oil. 7.66 g 22% yield.

Phthalimide (6.88 g, 46.8 mmol), $K_2CO_3$ (25.86 g, 187.1 mmol) and 1 (7.00 g, 23.4 mmol) were added to 200 mL of anhydrous DMF. The temperature was raised to 70° C. and the suspension was left to react overnight under nitrogen atmosphere at constant stirring. The solvent was evaporated in vacuo and the resulting solids were dissolved in 500 mL of $ddH_2O$. The aqueous phase was extracted 3× with 500 mL of $CH_2Cl_2$. The organic phase was dried using anhydrous $Na_2SO_4$ and filtered using a Buchner filter. The solvent was evaporated in vacuo and the resulting oil was dissolved in 25% ethyl acetate in hexanes and filtered a second time. The resulting oil was dissolved in 10% ethyl acetate in hexanes and filtered once again. The final oil residue was purified using silica chromatography 10% ethyl acetate in hexanes to yield. 7.27 g 85% yield.

Hydrazine (2.58 mL) and 2 (3.0 g) where combine in 100 mL of anhydrous ethanol. The solution was heated to 80° C. under constant stirring, after reaching said temperature a large compact white precipitate appeared, the solution was let to react overnight. The solution was allowed to cool to room temperature and filtered. The solids were washed with warm (50-60° C.) ethanol. The filtrate and the wash fractions were collected and the solvent evaporated in vacuo. The resulting solids were dispersed in $CHCl_3$ (300 mL) and washed with H2O (150 mL) 2× and brine (150 mL) 1×. The organic phase was dried over sodium sulfate anhydrous and purified using silica chromatography 5-10% (10% of 28% ammonium hydroxide in methanol) in CH2Cl2 1.82 g 94% yield.

A suspension of magnesium turnings (0.92 g) in dry THF (15 mL) was prepared in a 3-neck flask equipped with a condenser, and kept under nitrogen. Compound 1 (3.45 g) was added dropwise to this mixture, which proceeded to auto-reflux for 30 m. The solution was filtered over celite into another 3-neck flask, which was kept at −41° C. using a dry-ice acetonitrile bath. A separate solution, consisting of 2,3-O-Isopropylidene-D-glyceraldehyde (0.5 g) dissolved in 10 mL of dry THF is prepared in the glovebox and added dropwise to the Grignard reagent. The solution was allowed to stir for 2 h., and subsequently quenched by addition of methanol. After warming to room temperature, saturated $NH_4Cl_{(aq)}$ is added (100 mL) and the resulting mixture washed three times with ethyl ether (100 mL). The organic layers were combined and dried using $Na_2SO_4$ and the solvent evaporated in vacuo. The resulting oil was purified using silica chromatography 10-70% ethyl acetate in hexanes. 0.753 g 56% yield.

Pyridinium p-toluenesulfonate (0.594 g) was added to a solution of 4 (0.753 g) in methanol (75 mL). The solution was heated to reflux and allowed to react overnight. After cooling to rt, the solvent was evaporated in vacuo and the resulting solids were treated with a solution of $NaHCO_3$ (50 mL). The aqueous solution was then washed three times with DCM, and the organic layers were combined and dried using $Na_2SO_4$. The solvent was evaporated in vacuo, and the resulting solid purified using silica chromatography 5-11% methanol in DCM.

Figure 12:
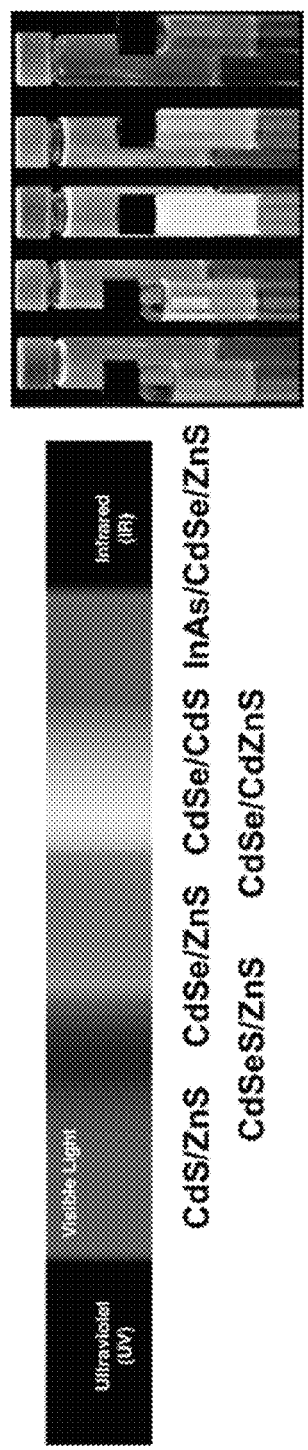
FIG. 12 shows a color series of water soluble nanocrystals.
Figure 13A:
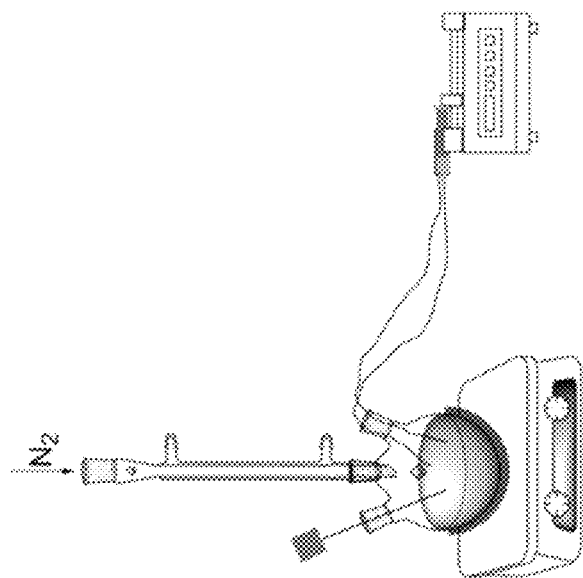
FIG. 13A shows a setup for core-shell nanocrystals synthesis.
Figure 13B:
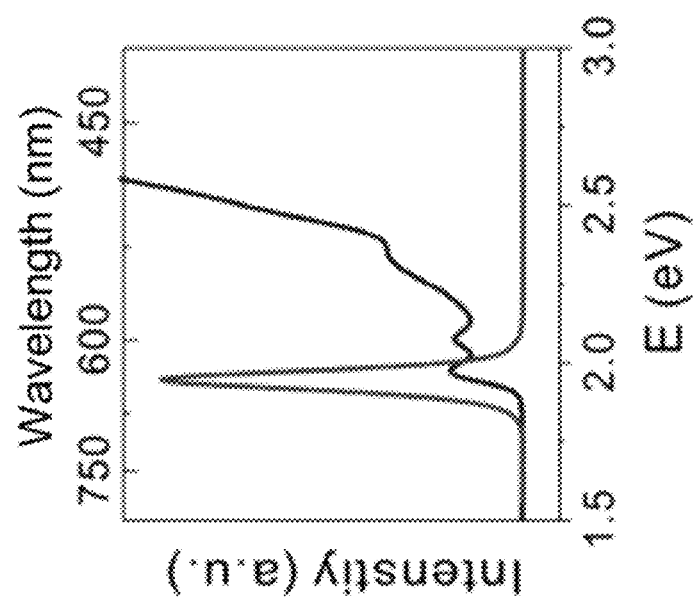
FIG. 13B shows typical absorption (blue) and PL (red) spectra of CdSe/CdS core-shell nanocrystals.
Figures 14A, 14B:
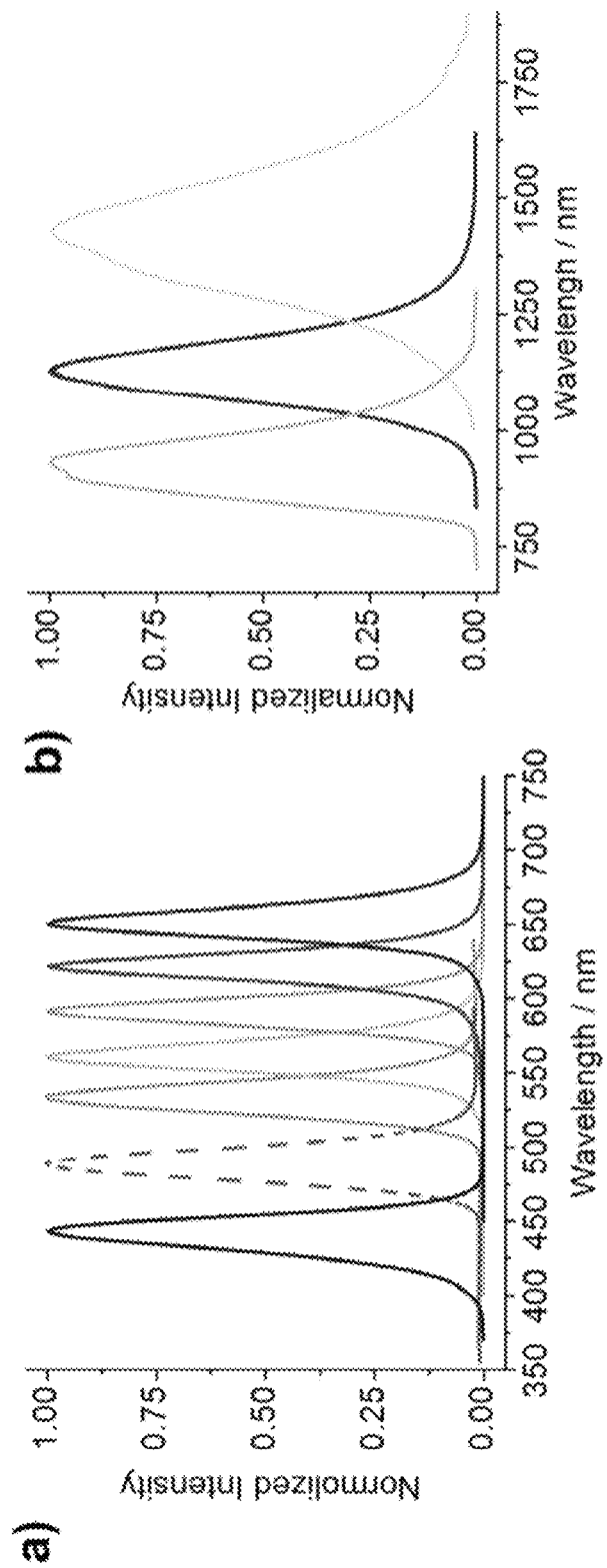
FIG. 14A shows photoluminescence spectra of nanocrystals emitting in the visible region.
FIG. 14B shows photoluminescence spectra of nanocrystals emitting in the SWIR region.
Figure 15:
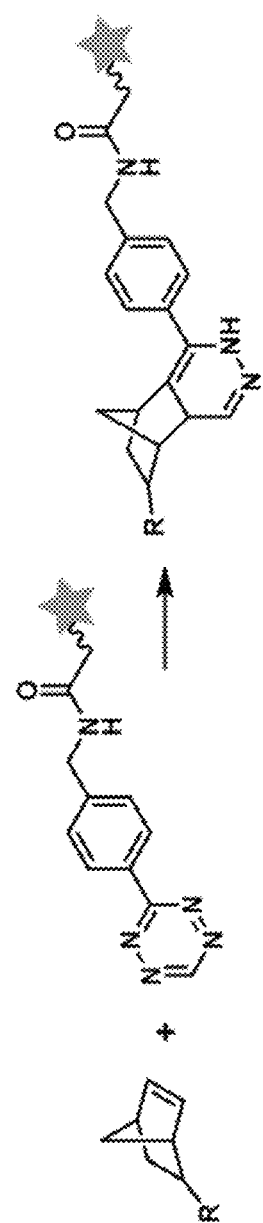
FIG. 15 shows biorthogonal click chemistry between norbornene and 1,2,4,5-tetrazine.
Figure 16A:
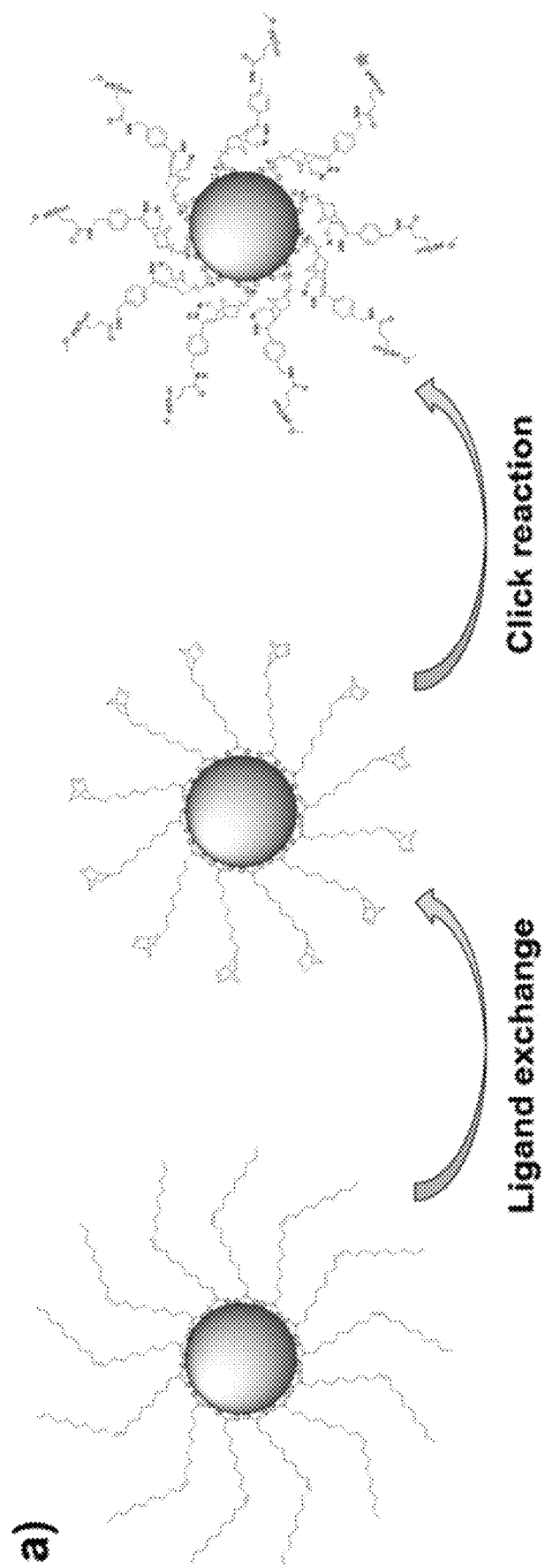
FIG. 16A shows synthetic route of water soluble nanocrystals.
Figure 16C:
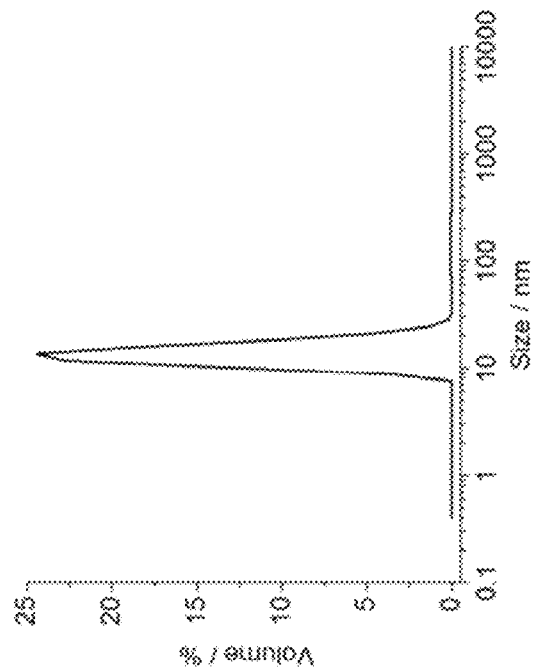
FIG. 16C shows size and size distribution of nanocrystal-PEG500, as determined by dynamic light scattering (DLS).
Figure 16B:
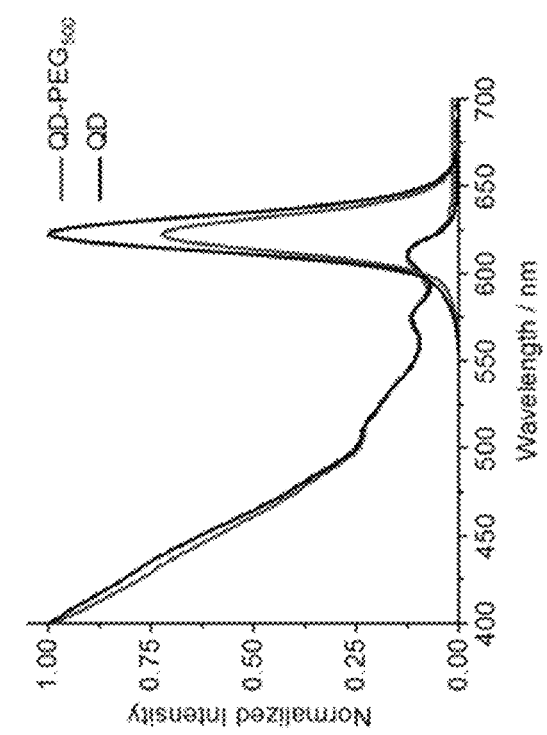
FIG. 16B shows absorption and photoluminescence spectra of nanocrystals as synthesized and nanocrystal-PEG500.
Figure 18A:
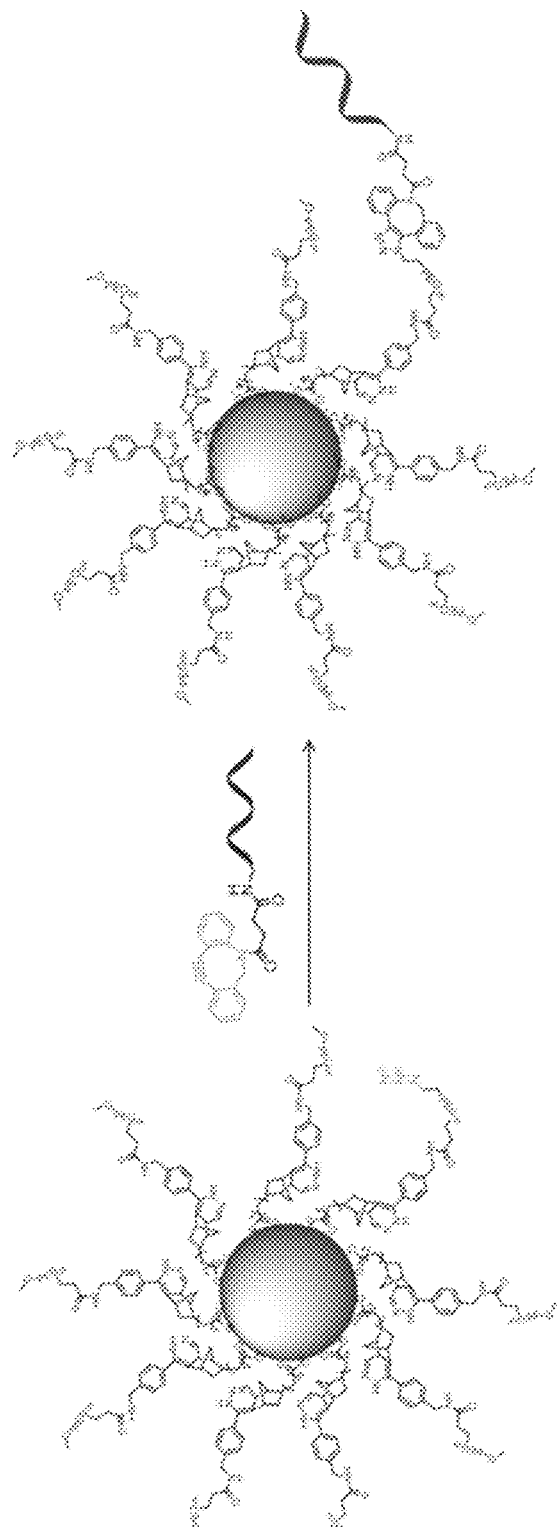
FIG. 18A shows conjugation of ssDNA oligo onto water soluble nanocrystal.
Figures 18B, 18C:
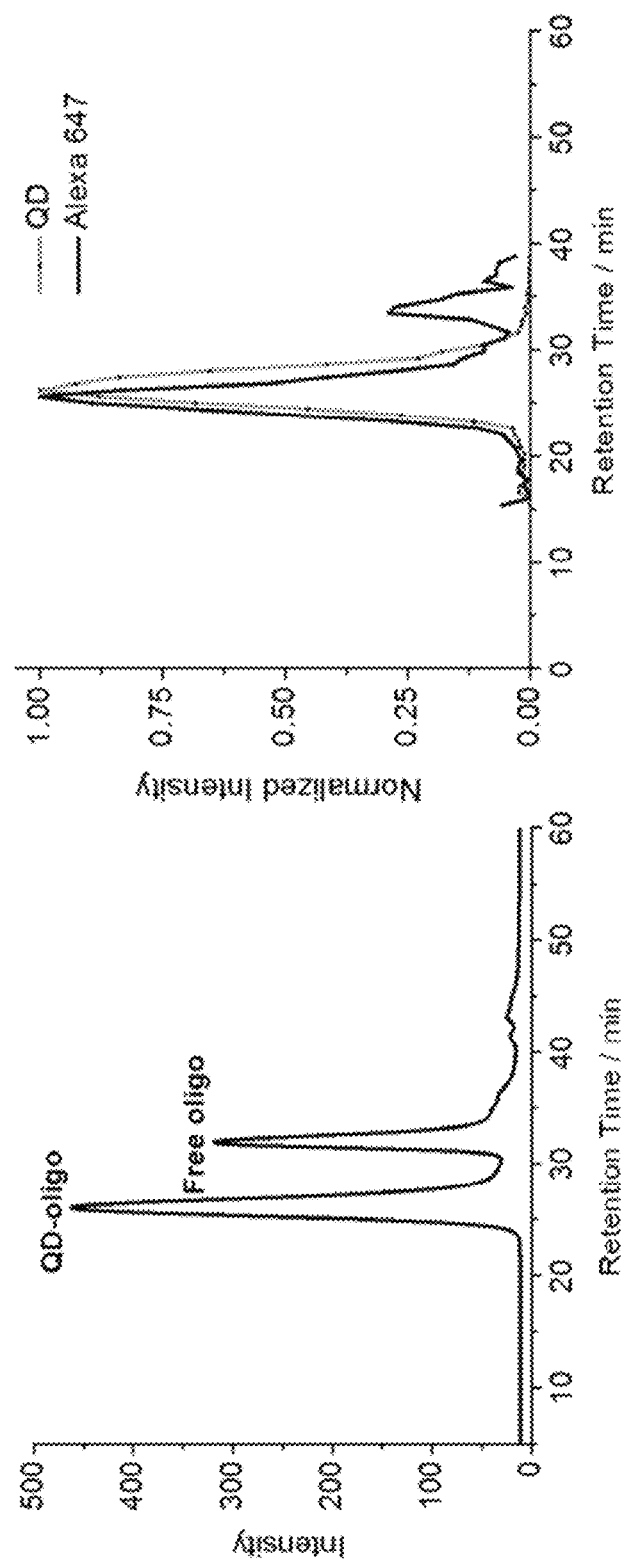
FIG. 18B shows Gel-filtration chromatography (GFC) trace of purification of nanocrystal-oligo after conjugation.
FIG. 18C shows GFC trace of nanocrystal-oligo after hybridizing with complimentary oligo-Alexa647.

FIG. 12 shows a color series of water soluble nanocrystals. FIG. 13A shows a setup for core-shell nanocrystals synthesis; FIG. 13B shows typical absorption and PL spectra of CdSe/CdS core-shell nanocrystals; FIG. 13C shows TEM pictures of i) CdSe/ZnS nanocrystals, ii) CdSe/CdS nanocrystals, and iii) InAs/CdSe/ZnS. FIG. 14A shows photoluminescence spectra of nanocrystals (from left to right CdS/ZnS, CdSeS/ZnS, CdSe/ZnS, CdSe/ZnS, CdSe/CdZnS, CdSe/CdS. CdSe/CdS) emitting in the visible region; FIG. 14A shows photoluminescence spectra of nanocrystals emitting in the SWIR region. FIG. 15 shows biorthogonal click chemistry between norbornene and 1,2,4,5-tetrazine. FIG. 16A shows synthetic route of water soluble nanocrystals. Native ligand oleic acid was first replaced by 5-norbornene-2-nonanoic acid, followed by conjugation of tetrazine-PEG500. FIG. 16B shows absorption and photoluminescence spectra of nanocrystals as synthesized and nanocrystal-PEG500; FIG. 16C shows size and size distribution of nanocrystal-PEG500, as determined by dynamic light scattering (DLS). The absorption spectra show no significant differences between the two samples, but the emission intensity decreases when the nanocrystals are transferred into water. On average, the nanocrystals in water retain 70% of their original PLQY (typically ≥90% in hexanes), and achieve stupendous levels of brightness on par with the best ligand exchange techniques to date. Unlike other ligand exchange procedures, however, the method does not remove the hydrophobic coatings that result from synthesis. Instead, it builds upon them, endowing the nanocrystals with new and desirable characteristics, including hydrophilicity, as demonstrated here. Additionally, FIG. 16C shows that the final constructs exhibit a hydrodynamic size that is compact. Moreover, using the results from DLS and those collected using TEM, it was estimated that the organic coating contributes four nanometers, on average, to the total hydrodynamic diameter. FIGS. 17A-17B is a schematic illustration of nanocrystal-oligo probe targeting the sequence of interest. FIG. 17A shows nanocrystal-oligo probe targets the sequence on the gene via a secondary sequence; FIG. 17B shows a complex of ssDNA library was engineered with a sequence complimentary to the oligo sequence on nanocrystals, followed by fluorescence in situ hybridization (FISH) experiment to detect target gene. FIG. 18A shows conjugation of ssDNA oligo onto water soluble nanocrystal; FIG. 18B shows Gel-filtration chromatography (GFC) trace of purification of nanocrystal-oligo after conjugation; FIG. 18C shows GFC trace of nanocrystal-oligo after hybridizing with complimentary oligo-Alexa647.

Figure 19:
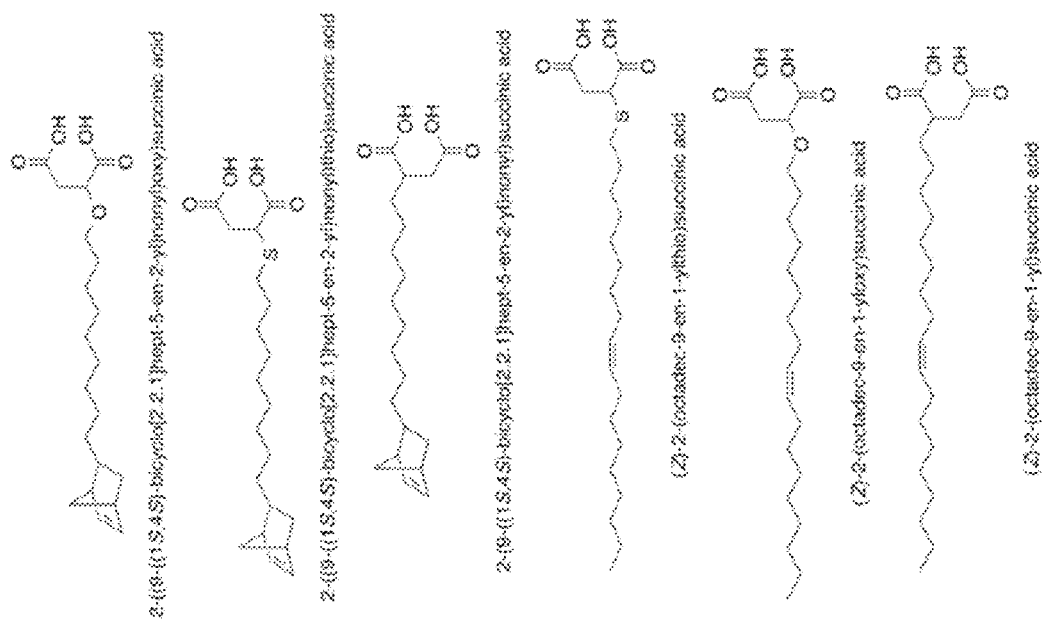
FIG. 19 shows a list of bidentate ligands that can be used to passivate a nanocrystal.
Figure 20:
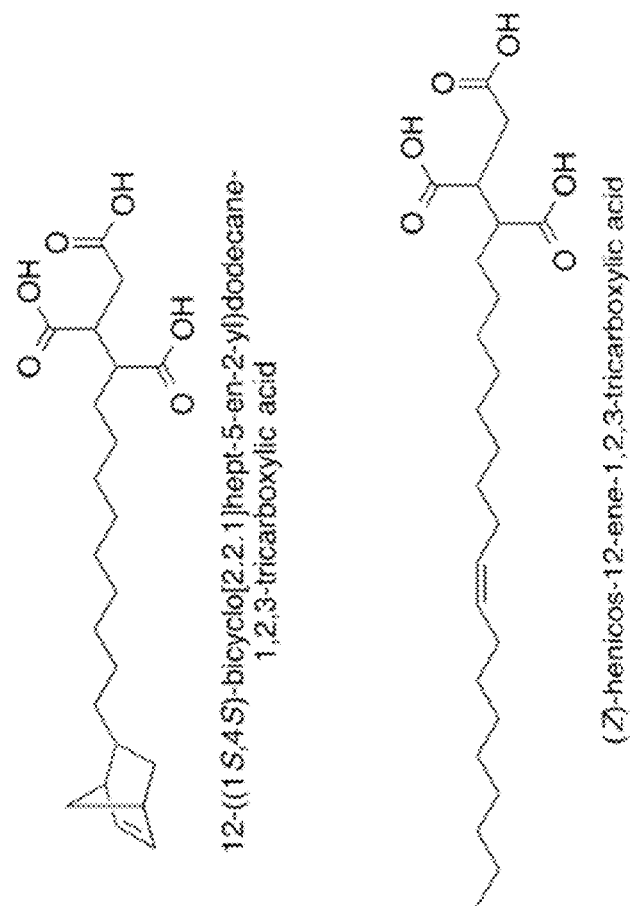
FIG. 20 shows a list of tridentate ligands that can be used to passivate a nanocrystal.

Monodentate ligand, such as monodentate norbornene, can be used to passivate a surface of a nanocrystal. Multidentate ligands or polymers can also be used to passivate a nanocrystal. FIG. 19 shows a list of bidentate ligands that can be used to passivate a nanocrystal. FIG. 20 shows a list of tridentate ligands that can be used to passivate a nanocrystal. Bidentate or tridentate norbornene can increase the solubility of a nanocrystal in solvents, such as hydrophobic solvents. A mixture of bidentate norbornene and bidentate oleic acid or tridentate norbornene and tridentate oleic acid can be added to the growth solution after nanocrystal synthesis. Nanocrystals passivated with monodentate ligand, such as monodentate norbornene, Multi-dentate ligands, such as Bidentate or tridentate norbornene, or polymers can be used for in vivo biological experiments.

Figure 23:
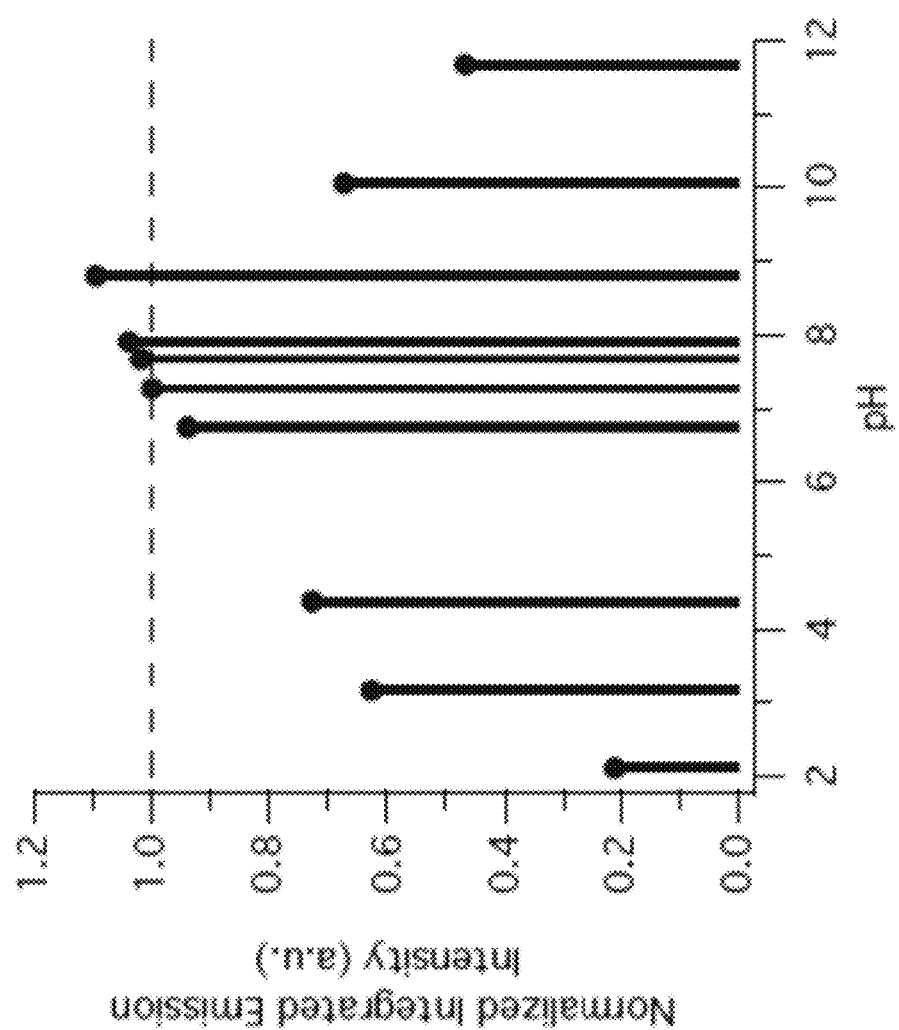
FIG. 23 is a graph depicting stability of the 5-norbornene-2-nonanoic-coated nanocrystals in aqueous solutions at different pHs after incubation at RT for 4 hours. The graph shows that the nanocrystals are stable at neutral and biologically relevant pHs.

The stability of nanocrystals in aqueous solutions with different pHs was studied. As shown in FIG. 23, the nanocrystals appear to be stable at neutral pHs, however, at high concentrations of hydrogen or hydroxide ions the photoluminescent quantum yield (PLQY) falls rapidly in response to a less passivated surface.

Another example that illustrates the utility of this method involves the synthesis of $CsPbBr_3$ perovskite nanocrystals.

Figure 22:
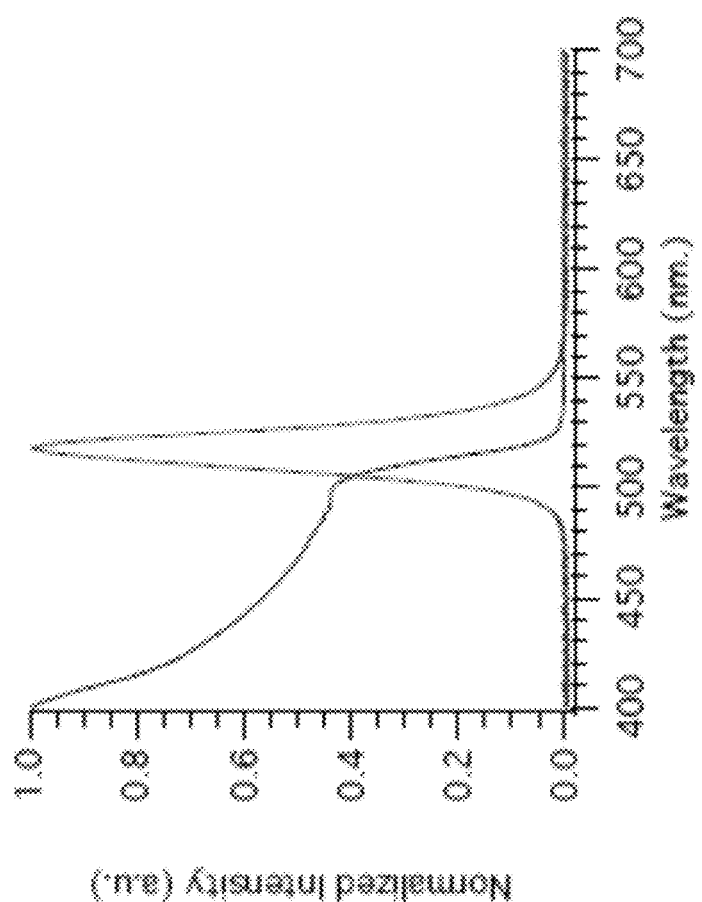
FIG. 22 is a graph depicting absorption and emission spectra of 5-norbornene-2-nonanoic acid-coated $CsPbBr_3$ perovskite nanocrystals in hexanes.

Here, the metal-carboxylate-based precursor, cesiumoleate, was replaced by a NB-Monodentate-containing precursor (cesium 10-(norborn-2-en-5-yl)decanoate), which was then used to prepare the nanocrystals. FIG. 22 shows the absorption and emission spectra of the resulting nanoparticles in hexanes, which resembles those obtained using oleic acid. The perovskite inorganic structure readily dissolves in water, which destroys the material.

The 5-norbornene-2-nonanoic acid works well for functionalizing the surface of a broad range of nanocrystals and for dispersing them in water. Notwithstanding, the stability of the water-soluble nanocrystals hinges on the binding affinity of a single carboxylic acid anchoring group per ligand. This metal-ligand complex, although relatively strong when compared to those composed of L-type ligands, decays in solutions with high salt concentration and in the presence of organic molecules that compete for binding to the surface. Therefore, water-soluble nanocrystals obtained through this method are not suitable for biological applications, which typically involve cellular media. In order to increase the stability of the metalorganic complex, a new ligand was developed that possess two carboxylic acid groups in close proximity, for maximum chelate effect. The Scheme below describes a synthesis of this norbornene-bidentate ligand.

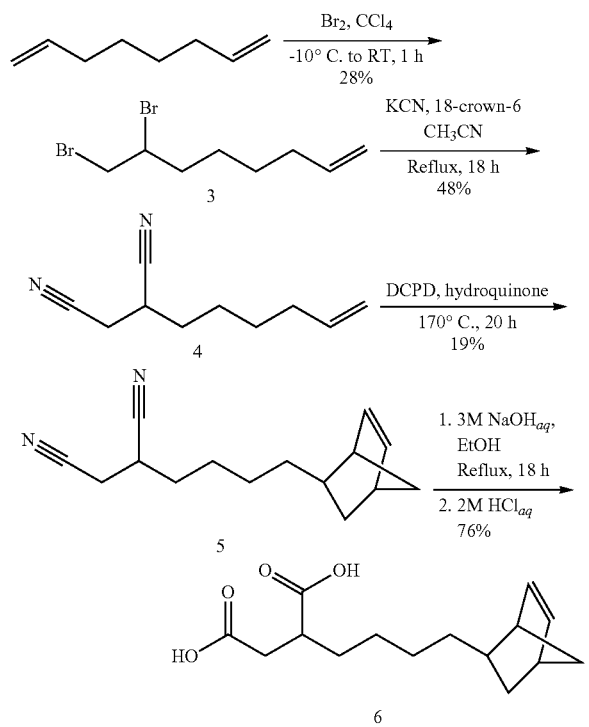

All chemicals unless otherwise noted were obtained from Sigma Aldrich and used as received. All solvents were spectrophotometric grade and purchased from EMD Millipore. Absolute ethanol (200° Proof) was purchased from Koptec. Flash column chromatography was performed using a Teledyne Isco CombiFlash Companion. $^1$H NMR spectra, and $^{13}$C NMR spectra with complete proton decoupling were recorded on a Bruker DRX 400 NMR spectrometer. Chemical shifts are reported in ppm from tetramethylsilane, and using the solvent resonance as the internal standard (CDCl$_3$: $^1$H NMR<7.26, $^{13}$C NMR<77.16). UV-Vis-NIR absorbance spectra were collected using a Cary 5000 spectrophotometer. UV-Vis absorbance spectra were taken using an HP 8453 diode array spectrophotometer or a BioTek Synergy 4 Microplate Reader, on which some emission spectra were also recorded. The rest of the emission spectra in the visible were collected using a Fluoromax-3 spectrofluorometer and in the NIR using an calibrated InGaAs array detector. pH measurements were collected using an Orion PerpHecT model 310 LogR Meter operating a Orion PerpHecT Ag/AgCl electrode.

Ethyl 10-(norborn-2-en-5-yl)decanoate (1)

Caution! This reaction involves the use of a pressure vessel. The use of a blast shield is recommended. Dicyclopentadiene (15.73 g 0.119 mol), ethyl undecylenoate (30.30 g, 0.143 mol) and hydroquinone (39.3 mg, 0.36 mmol) were added to a 65 mL pressure vessel equipped with a Teflon valve. The temperature was raised to 170° C. and the sample was left to react for 20 h under constant stirring. After cooling to room temperature, the solution was distilled under vacuum (200 mTorr). A fraction containing 1 with vapor temperature of 120-130° C. was collected, and set aside for 4 hours to allow for a solid side-product to precipitate, which was then filtered out of solution using a fritted glass filter funnel. The filtrate was collected and stored at 4° C. overnight to induce a second precipitation event. Another filtration step yields 1 as a clear oil. (7.69 g, 0.028 mol, 19% yield): mixture of exo and endo (2:8, respectively) $^1$H NMR (400 MHz, CDCl3) MAJOR ISOMER (endo)<(ppm) 6.09 (m, 1H), 5.89 (m, 1H), 4.11 (q, J=7.6 Hz, 2H), 2.73 (m, 2H), 2.27 (t, J=7.4 Hz, 2H), 1.94 (m, 1H), 1.81 (m, 1H), 1.60 (m, 2H), 1.38–1.22 (br, 11H), 1.24 (t, J=7.1 Hz, 3H), 1.19 (d, J=8.0 Hz, 1H), 1.03 (m, 2H), 0.47 (m, 1H); $^{13}$C{$^1$H} (100 MHz, CDCl$_3$)<(ppm) 174.0, 137.0, 132.6, 60.3, 49.7, 45.5, 42.6, 38.9, 34.9, 34.5, 32.6, 30.0, 29.6, 29.4, 29.3, 28.7, 25.1, 14.4; HRMS (DART/FT-MS): m/z [M+H]$^+$ Calcd for C$_{18}$H$_{31}$O$_2$ 279.2319; Found 279.2310.

10-norborn-2-en-5-yl)decanoic Acid (2)

Compound 1 (6.81 g, 0.024 mol) was added dropwise to a 1M NaOH solution in methanol (105 mL), and stirred at room temperature for 4 hours. The solution was transferred into a separation funnel and washed with hexanes (150 mL, 3×) to remove any unreacted material. The methanol phase was then acidified to pH 3 using a 1M HCl aqueous solution, and the product was extracted into hexanes (150 mL, 3×). The combined organic layers were dried over Na$_2$SO$_4$, and the solvent was evaporated under reduced pressure to obtain 2 as a white solid. (2.82 g, 0.011 mol, 47% yield): mixture of exo and endo (2:8, respectively) HNMR (400 MHz, CDCl$_3$) MAJOR ISOMER (endo)<(ppm) 11.53 (br, 1H), 6.10 (m, 1H), 5.90 (m, 1H), 2.74 (m, 2H), 2.34 (t, J=7.4 Hz, 2H), 1.96 (m, 1H), 1.82 (m, 1H), 1.63 (m, 2H), 1.39×1.23 (br, 11H), 1.20 (d, J=8.0 Hz, 1H), 1.04 (m, 2H), 0.48 (m, 1H); $^{13}$C{$^1$H} (100 MHz, CDCl3)<(ppm) 180.5, 137.0, 132.6, 49.7, 45.5, 42.7, 38.9, 34.9, 34.2, 32.6, 30.0, 29.6, 29.4, 29.2, 28.8, 24.8; HRMS (DART/FT-MS): m/z [M–H] Calcd for C$_{16}$H$_{25}$O$_2$ 249.1860; Found 249.1856.

Synthesis of 1 and 2 was performed at six times the scale described above and have obtained similar reaction yields.

7,8-dibromooct-1-ene (3)

1,7-octadiene (100 g, 0.907 mol) and CCl4 (600 mL, 1.51M) were mixed in a 2000 mL round bottom flask equipped with an addition funnel, and cooled to −10° C. using an ice-salt bath. A solution of bromine (42.0 mL, 130.3 g, 0.815 mol, 0.9 eq) in CCl$_4$ (110 mL, 7.4M) was added drop-wise, and with care to not allow the temperature to rise above −5° C. The sample was protected from light, and stirred for an additional hour. The solvent was evaporated in vacuo, and the resulting oil was distilled under vacuum (300 mTorr) to obtain 3 with vapor temperature of 41-44° C. as a clear, light-yellow oil. (69.19 g, 0.256 mol, 28% yield) [Note: This product is sensitive to ambient conditions, and may darken over time.] $^1$H NMR (400 MHz, CDCl3)<(ppm) 5.81 (m, 1H), 5.02 (ddt, Jd=17.1 Hz, Jd=2.1 Hz, Jt=1.6 Hz, 1H), 4.96 (ddt, Jd=10.2 Hz, Jd=2.1 Hz, Jt=1.2 Hz, 1H), 4.16 (m, 1H), 3.85 (dd, J1=10.2 Hz, J2=4.4 Hz, 1H), 3.63 (dd, J1=J2=10.0 Hz, 1H), 2.19–2.06 (br, 3H), 1.79 (m, 1H), 1.62–1.39 (br, 4H); $^{13}$C{$^1$H} (100 MHz, CDCl$_3$)<(ppm) 138.6, 114.9, 53.1, 36.4, 36.0, 33.6, 28.2, 26.3; HRMS (DART/FT-MS): m/z [M+H]$^+$ Calcd for $C_8H_{15}Br_2$ 270.9518; Found 270.9520.

7,8-dicyanooct-1-ene (4)

Caution! This reaction makes use of cyanide salts, which can produce highly toxic hydrogen cyanide gas. The use of a well-ventilated fume hood, and personal protective equipment is required. Compound 3 (60.79 g, 0.225 mol), 18-crown-6 (59.47 g, 0.225 mol), finely ground potassium cyanide (30.84 g, 0.476 mol), and anhydrous acetonitrile (325 mL, 0.69M) were combined in a 2000 mL round bottom flask equipped with a condenser, and stirred at reflux for 36 hours. After cooling to room temperature, the solution was filtered through silica gel (~1 inch thick in a 150 mL fritted glass filter funnel). The silica gel was then washed thrice with DCM (75 mL), the combined filtrates were collected, and the solvent was evaporated in vacuo. The resulting oil was distilled under vacuum (200 mTorr), and a fraction with vapor temperature of 100-120° C., containing a mixture of 18-crown-6 and 4, was collected. Excess 18crown-6 was precipitated out of solution by adding the mixture into 400 mL of cold acetonitrile (−5° C.) drop-wise. The newly formed crystals were filtered using a fritted glass filter funnel, and washed with excess cold acetonitrile. The filtrate was collected, and the solvent was evaporated under reduced pressure. This process was repeated a second time to precipitate more 18-crown-6 out of solution. The resulting oil was then purified using silica gel chromatography (hexanes/ethyl acetate, 2:3) to obtain 4 as clear oil. (17.44 g, 0.107 mol, 48% yield) $^1$H NMR (400 MHz, CDCl3)<(ppm) 5.78 (m, 1H), 5.02 (ddt, Jd=17.1 Hz, Jd=2.0 Hz, Jt=1.6 Hz, 1H), 4.98 (ddt, Jd=10.2 Hz, Jd=2.0 Hz, Jt=1.2 Hz, 1H), 2.90 (m, 1H), 2.75 (dd, J1=16.9 Hz, J2=6.2 Hz, 1H), 2.69 (dd, J1=16.9 Hz, J2=7.2 Hz, 1H), 2.09 (q, J=6.8 Hz, 2H), 1.78 (m, 2H), 1.64–1.41 (br, 4H); $^{13}$C{$^1$H} (100 MHz, CDCl3) <(ppm) 138.0, 119.0, 115.7, 115.3, 33.3, 31.4, 28.5, 28.1, 26.1, 21.1; HRMS (DART/FT-MS): m/z [M+H]$^+$ Calcd for $C_{10}H_{15}N_2$ 163.1230; Found 163.1233.

5-(5,6-dicyanohexyl)norborn-2-ene (5)

Dicyclopentadiene (11.33 g 0.086 mol), 4 (16.65 g, 0.103 mol) and hydroquinone (28.1 mg, 0.26 mmol) were added to a 65 mL pressure vessel. The temperature was raised to 170° C., and the sample was left to react for 20 hours under constant stirring. The solution was cooled to room temperature, transferred to a round bottom flask equipped with a secondary liquid N2 cold trap, and heated to 120° C. under vacuum to remove any volatile side product. The resulting oil was then purified using silica gel chromatography (hexanes/ethyl acetate gradient 9:1 to 1:1, v/v), to obtain a fraction containing the desired product mixed with 4. Compound 5 was obtained through vacuum distillation (0.6 mTorr) with vapor temperature of 145° C. as a clear, colorless and viscous oil (4.51 g, 0.019 mol, 19% yield): mixture of exo and endo (2:9, respectively) $^1$H NMR (400 MHz, CDCl$_3$) MAJOR ISOMER (endo)<(ppm) 6.10 (m, 1H), 5.88 (m, 1H), 2.89 (m, 1H), 2.74 (m, 2H), 2.73 (dd, J1=16.9 Hz, J2=6.3 Hz, 1H), 2.68 (dd, J1=16.9 Hz, J2=7.1 Hz, 1H), 1.95 (m, 1H), 1.82 (m, 1H), 1.73 (m, 2H), 1.58–1.25 (br, 5H), 1.20 (d, J=8.0 Hz, 1H), 1.07 (m, 2H), 0.47 (m, 1H); $^{13}$C{$^1$H} (100 MHz, CDCl3)<(ppm) 137.2, 132.2, 119.1, 115.8, 49.6, 45.4, 42.5, 38.6, 34.4, 32.4, 31.5, 28.5, 27.9, 27.0, 21.1; FIRMS (DART/FT-MS): m/z [M+H]$^+$ Calcd for C15H21N2 229.1699; Found 229.1704.

5-(5,6-dicarboxyhexyl)norborn-2-ene (6)

Compound 5 (4.25 g, 0.019 mol) was dissolved in a 3M NaOH solution (100 mL) and ethanol (110 mL) in a 500 mL round bottom flask equipped with a condenser. The solution was heated to reflux, and kept under constant stirring for 18 hours. After cooling to room temperature, TLC was used to confirm that all the starting material had reacted. The solvent was evaporated under reduced pressure and the resulting solid was re-dissolved in deionized H$_2$O (100 mL). The solution was transferred into a separation funnel and washed with diethyl ether (75 mL, 3×). The aqueous layer was transferred into an Erlenmeyer flask, combined with diethyl ether (75 mL), and kept under vigorous stirring. The resulting mixture was acidified to pH 2 using a 2M HCl solution. [Note: It was found that adding diethyl ether during the neutralization step removes the diprotic acid from the aqueous phase as soon as it is fully neutralized, and prevents the formation of an ethyl monoester side product.] The mixture was transferred into a separation funnel, and the product was extracted into diethyl ether (75 mL, 3×). The combined organic layers were dried over Na$_2$SO$_4$, and the solvent evaporated under reduced pressure. The resulting solid was then purified using silica gel chromatography (dichloromethane/methanol gradient 95:5 to 85:15, v/v) to obtained 6 as a white solid. (3.75 g, 0.014 mol, 76% yield): mixture of exo and endo (2:9, respectively) $^1$H NMR (400 MHz, CDCl$_3$) MAJOR ISOMER (endo)<(ppm) 11.96 (br, 2H), 6.10 (m, 1H), 5.90 (m, 1H), 2.83 (m, 1H), 2.74 (m, 2H), 2.72 (dd, J1=17.0 Hz, J2=10.8 Hz, 1H), 2.50 (dd, J1=17.0 Hz, J2=3.6 Hz, 1H), 1.95 (m, 1H), 1.82 (m, 1H), 1.68 (m, 1H), 1.54 (m, 1H), 1.39–1.24 (br, 5H), 1.20 (d, J=8.0 Hz, 1H), 1.07 (m, 2H), 0.47 (m, 1H); $^{13}$C{$^1$H} (100 MHz, CDCl3)< (ppm) 181.9, 178.9, 137.1, 132.5, 49.7, 45.5, 42.7, 41.2, 38.8, 35.8, 34.6, 32.5, 31.8, 28.5, 27.2; HRMS (DART/FT-MS): m/z [M−H]$^-$ Calcd for $C_{15}H_{21}O_4$ 265.1445; Found 265.1469.

2-(4-(1,2,4,5-tetrazin-3-yl)phenyl)acetic Acid (7)

The amine-reactive tetrazine was prepared according to the method described by Yang et al. It was found to be very difficult to completely wash away the Ni(OTf)$_2$ catalyst—a powerful quencher of nanocrystal fluorescence—from the final product, thus, it was omitted from the synthesis.

Tetrazine-PEG500 (Tz-PEG) Compound 7 (0.50 g, 2.33 mmol), DCC (0.58 g, 2.79 mmol), and NHS (0.32 g, 2.79 mmol) were dissolved in DCM (40 mL) and the resulting solution was allowed to react at room temperature for two hour under constant stirring. The mixture was filtered using a 0.45 μm PTFE syringe filter and added to a solution containing O-(2-Aminoethyl)-O'-methylpolyethylene glycol (1.0 g, 1.94 mmol) in DCM (5 mL), which was kept at room temperature under constant stirring for 12 hours. The organic phase was then washed thrice with water (20 mL) and dried over Na$_2$SO$_4$. The solvent was evaporated in vacuo and the resulting solid was purified using silica gel chromatography (dichloromethane/methanol gradient 92:8 to 90:10, v/v), to obtain Tz-PEG as a pink solid.

Cadmium Selenide Core Nanocrystals

Wurtzite-CdSe nanocrystals were synthesized using the method described by Car-bone, et al.

Cadmium Oleate

Cadmium oxide (2.57 g 0.020 mol), and oleic acid (40.0 mL, 0.127 mol) were combined in a three-necked round-bottomed flask equipped with a Hempel column, and a thermocouple that was connected to a heating circuit and a heating mantle for precise temperature control. The solution was degassed under vacuum (<200 mTorr), with constant stirring, and at high temperature according to the following heating ramp: room temperature for 10 minutes, 80° C. for 1 hour, 120° C. for 1.5 hour, and 150° C. for 10 minutes. The reaction flask was then filled with $N_2$ gas, and the temperature was raised to 160° C. and held constant until the solution became clear, and colorless. The temperature was then lowered to 120° C., and ODE (60 mL) was swiftly injected into the mixture. The temperature was lowered to 80° C., and the solution was placed under vacuum to degas for one hour. The hot solution was cannula-transferred to a dry Erlenmeyer flask equipped with a rubber septum seal. The cadmium oleate was stored at room temperature as a white soft solid, and was melted before use by partially immersing in a hot oil bath (80° C.).

The Synthesis of Cadmium Selenide-Cadmium Sulfide Core-Shell Nanocrystals Coated with NB-Monodentate Using Metal-Carboxylate Precursors The epitaxial growth of CdS followed a modified procedure described by Chen, et al. A solution of ODE (3 mL) and OAm (3 mL) was prepared in a 100 mL four-necked round-bottomed flask equipped with a Hempel column, and a thermocouple that was connected to a heating circuit and a heating mantle for precise temperature control. A solution of CdSe cores (30 nmols) in hexanes was injected into the mixture, and the resulting reaction solution was degassed under vacuum (<200 mTorr) for one hour at room temperature, and constant stirring. The temperature was raised to 120° C., and degassed for an additional 20 minutes to completely remove the hexanes, and any trace of water and oxygen. The reaction flask was filled with $N_2$ gas, and the temperature was raised to 310° C. and held constant throughout the infusion of the CdS precursor materials. During the heating step, and when the temperature reached 240° C., the infusion of cadmium and sulfur precursor solutions was initiated using a syringe pump, and set to proceed at a rate such that the total material required for four monolayers was injected in two hours. Once the infusion was completed, the temperature was reduced to 150° C. and a solution of 2 (2.0 g, 7.8 mmol in 3 mL of ODE) was swiftly injected. The ligand exchange reaction was allowed to proceed for one hour. The heating mantle was removed and the reaction flask was rapidly cooled to room temperature with the aid of an air blower. The nanocrystals were precipitated from the growth solution using acetone, and separated from the mother liquor using centrifugation (7,500 RPM, 5 minutes). The resulting near-colorless supernatant was discarded. The nanocrystals were further purified through a second precipitation event using hexanes (solvent), and acetone (anti-solvent). Finally, the nanocrystals were dispersed in hexanes and stored at room temperature.

Precursor Solutions

A cadmium precursor solution was prepared by diluting the appropriate amount of cadmium oleate solution that is required to grow four epitaxial monolayers of CdS with ODE to a final concentration of 0.143M. A sulfur precursor solution was prepared by dissolving 1-octanethiol (1.2× molar excess relative to cadmium oleate) in ODE for a final concentration of 0.171M.

The Synthesis of Cadmium Selenide-Cadmium Sulfide Core-Shell Nanocrystals Coated with NB-Monodentate Using Organometallic Precursors CdSe—CdS nanocrystals were synthesized using the traditional organometallic according to a procedure described in the literature. Once the precursor infusion was completed, the temperature was held at 130° C. a solution of 2 (2.0 g, 7.8 mmol in 3 mL of ODE) was swiftly injected and the ligand exchange reaction was allowed to proceed for one hour. Afterwards, the reaction flask was rapidly cooled to room temperature with the aid of an air blower. The nanocrystals were isolated from the growth solution using the same protocol described in the synthesis of CdSe—CdS nanocrystals using metal-carboxylate precursors.

Lead Sulfide Nanocrystals Coated with NB-Monodentate

Derivatizable PbS nanocrystals were synthesized according to a modified procedure described by Hines et al. and Zhang et al., in which OA was partially substituted for compound 2. nanocrystals of different sizes were prepared by adjusting the molar ratio of the carboxylic acid ligands (OA and 2) to lead, and to sulfur precursors. It was found empirically that large nanocrystals require a lower level of OA substitution (between 25 to 75%) in order to becolloidallystable. As mentioned, a high amount of tightly packed NB-Monodentate on the surface can decrease the number of interaction between the nanocrystal and the solvent and change the solubility of the final construct. After synthesis, the nanocrystals were precipitated from the growth solution using acetone, and separated from the mother liquor using centrifugation. The resulting supernatant was discarded. The nanocrystals were further purified through a second precipitation event using hexanes (solvent), and acetone (anti-solvent). Finally, the functionalized nanocrystals were dispersed in hexanes and stored at room temperature under $N_2$ atmosphere.

Cesium 10-(norborn-2-en-5-yl)decanoate (8)

$Cs_2CO_3$ (0.407 g, 2.5 mmol), 2 (1.01 g, 3.9 mmol) and ODE (20 mL) were combined in a three-necked round-bottomed flask equipped with a Hempel column, and a thermocouple that was connected to a heating circuit and a heating mantle for precise temperature control. The solution was degassed under vacuum (<100 mTorr), at constant stirring, and at 120° C. for one hour. The reaction flask was filled with $N_2$ gas and the temperature was raised to 150° C. and held constant until the solution ceases to evolve $CO_2$. The heating mantle was removed and the reaction flask was cooled to room temperature. The final solution was stored under $N_2$ atmosphere.

Cesium Lead Bromide Nanocrystals Coated with NB-Monodentate

Derivatizable CsPbBr3 nanocrystals were synthesized according to a modified method published by Protesescu et al., in which cesium-oleate and OA were completely substituted for 8 and 2, respectively.

Scheme 3.1: Synthesis of the Bidentate Carboxylate Ligand (1)

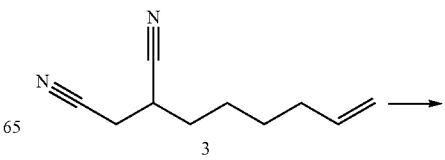

3

-continued

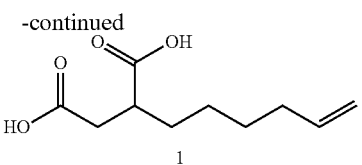

1

2-(hex-5-en-1-yl)succinic acid (1) 7,8-dicyanooct-1-ene (3)(17.44 g, 0.107 mol) was prepared according to the procedure described on section 2.5. It was dissolved in a 3M NaOH solution (500 mL) and ethanol (400 mL) in a 2000 mL round bottom flask equipped with a condenser. The solution was heated to reflux, and kept under constant stirring for 18 hours. After cooling to room temperature, TLC was used to confirm that all the starting material had reacted. The solvent was evaporated in vacuo and the resulting solid was re-dissolved in deionized $H_2O$ (300 mL). The solution was transferred into a separation funnel and washed with diethyl ether (150 mL, 3×). The aqueous layer was transferred into an Erlenmeyer flask, combined with diethyl ether (100 mL), and kept under vigorous stirring. The resulting mixture was acidified to pH 2 using a 2M HCl solution. [Note: It was found that adding diethyl ether during the neutralization step removes the diprotic acid from the aqueous phase as soon as it is fully neutralized, and prevents the formation of an ethyl monoester side product.] The mixture was transferred into a separation funnel, and the product was extracted into diethyl ether (100 mL, 3×). The combined organic layers were dried over $Na_2SO_4$, and the solvent evaporated under reduced pressure to obtained compound 1 as a white solid. (18.95 g, 0.093 mol, 88%) $^1H$ NMR (400 MHz, $CDCl_3$)<(ppm) 12.09 (br, 2H), 5.78 (m, 1H), 5.00 (ddt, $J_d$=17.1 Hz, $J_d$=2.0 Hz, $J_t$=1.6 Hz, 1H), 4.94 (ddt, $J_d$=10.2 Hz, $J_d$=2.1 Hz, $J_t$=1.2 Hz, 1H), 2.84 (m, 1H), 2.73 (dd, $J_1$=17.1 Hz, $J_2$=10.8 Hz, 1H), 2.51 (dd, $J_1$=17.1 Hz, $J_2$=3.8 Hz, 1H), 2.05 (q, J=6.9 Hz, 2H), 1.71 (m, 1H), 1.56 (m, 1H), 1.45–1.33 (br, 4H); $^{13}C\{^1H\}$ (100 MHz, $CDCl_3$)<(ppm) 181.7, 178.8, 138.6, 114.8, 41.1, 35.7, 33.5, 31.6, 28.7, 26.4; HRMS (DART/FT-MS): m/z $[M+NH_4]^+$ Calcd for $Cl_{10}H_{20}NO_4$ 218.1387; Found 218.1388.

Indium Arsenide-Cadmium Selenide-Cadmium Sulfide Core-Shell-Shell Nanocrystals Coated with NB-Monodentate InAs—CdSe—CdS nanocrystals were synthesized using the method described by Franke et al. Purified InAs—CdSe—CdS (10-20 nmols) and 2 (~50-100 mg), were dissolved in ODE (0.5 mL) and OAm (0.5 mL) in a three-necked round-bottomed flask. The temperature was raised to 150° C. and held constant for one hour. After synthesis, the nanocrystals were precipitated from the growth solution using acetone, and separated from the mother liquor using centrifugation. The resulting supernatant was discarded. The nanocrystals were further purified through a second precipitation event using hexanes (solvent), and acetone (anti-solvent). Finally, the functionalized nanocrystals were dispersed in hexanes and stored at room temperature.

Conjugation of Tetrazine-PEG500 and Water Solubilization nanocrystals (2 nmols) and Tz-PEG (~5 mg) were dissolved in $CHCl_3$ and the resulting solution was allowed to react at room temperature for one hour under constant stirring. Ethanol (50 μL) and hexanes (~5 mL) were added sequentially in order to precipitate the newly formed hydrophilic constructs. The nanocrystals were separated from the reaction mixture using centrifugation and collected into a pellet, which was then redissolve into $CHCl_3$. The precipitation process was repeated three times or until the supernatant was completely colorless. The final pellet was dissolved in water, dialyzed three times using a Millipore Amicon Ultra with a 30 kDa cut-off filter and filtered using a 0.02 μm HT Tuffrryn syringe filter before storing at room temperature.

Dynamic Light Scattering Measurement

The hydrodynamic size was measured on a Malvern Instruments ZetaSizer ZS90. The instrument's software was used fit the autocorrelation functions and calculate a volume weighted size distribution taking the average of three sets of data, each consisting of 25-50 individual measurements.

Photoluminescence Quantum Yield (PLQY) Measurement

The PLQY was measured using a Labsphere integrating sphere, a chopper working at 210 Hz in association with a Stanford Research Systems lock-in amplifier, and a 5 mW, 405 nm laser and a calibrated Sifor nanocrystals emitting in the visible or a 25 mW, 785 nm laser and a calibrated InGaAs detector for nanocrystals emitting in the NIR. A glass filter was also used to spectrally separate the photoluminescence from the excitation source.

Transmission Electron Microscopy (TEM)

TEM micrographs were taken using a JEOL 2010 Advanced High Performanced TEM operating at 200 kV.

pH Stability Measurement

A water-soluble CdSe—CdS nanocrystal stock solution was diluted to a concentration of 100 nM using various aqueous solutions ranging from pH 2 to pH 12. The samples were incubated at room temperature for four hours, and their relative fluorescence intensity was measured using a BioTek Synergy 4 Microplate Reader.

Other embodiments are within the scope of the following claims.

What is claimed is:

1. A nanocrystal composition comprising:
a nanocrystal, and
an outer layer including a ligand bound to the nanocrystal, wherein
the ligand includes a norbornene group and a carboxyl group.

2. The nanocrystal composition of claim 1, wherein the nanocrystal is a semiconductor nanocrystal including a core of a first semiconductor material.

3. The nanocrystal composition of claim 2, wherein the first semiconductor material is a Group II-VI compound, a Group II-V compound, a Group III-VI compound, a Group III-V compound, a Group IV-VI compound, a Group compound, a Group II-IV-VI compound, or a Group II-IV-V compound.

4. The nanocrystal composition of claim 2, wherein the first semiconductor material is ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof.

5. The nanocrystal composition of claim 2, wherein the semiconductor nanocrystal includes a second semiconductor material overcoated on the first semiconductor material.

6. The nanocrystal composition of claim 5, wherein the first semiconductor material has a first band gap, and the second semiconductor material has a second band gap that is larger than the first band gap.

7. The nanocrystal composition of claim 5, wherein the second semiconductor material is a Group II-VI compound, a Group II-V compound, a Group III-VI compound, a Group III-V compound, a Group IV-VI compound, a Group compound, a Group II-IV-VI compound, or a Group II-IV-V compound.

8. The nanocrystal composition of claim 5, wherein the second semiconductor material is ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

9. The nanocrystal composition of claim 1, wherein the ligand includes a 5-norbornene-2-nonanoate.

10. The nanocrystal composition of claim 1, wherein the nanocrystal includes a perovskite.

11. The nanocrystal composition of claim 1, wherein the nanocrystal includes a $CsPbCl_3$, a $CsPbBr_3$, or a $CsPbI_3$.

* * * * *